United States Patent
Niou et al.

(10) Patent No.: US 6,704,322 B1
(45) Date of Patent: Mar. 9, 2004

(54) SMART DIFFERENT PRIME CODE MULTIPLEXING SYSTEM

(75) Inventors: Choung-Han Niou, Taipei (TW); Yang-Han Lee, Taipei Hsien (TW); Meng-Hong Wang, Taipei (TW); Jyh-Yuan Wang, Taipei Hsien (TW); Kuo-Chun Wei, Taichung (TW)

(73) Assignee: National Science Council, Taipei (TW)

( * ) Notice: Subject to any disclaimer, the term of this patent is extended or adjusted under 35 U.S.C. 154(b) by 0 days.

(21) Appl. No.: 09/441,909

(22) Filed: Nov. 17, 1999

(51) Int. Cl.[7] .................. H04B 7/216; H04B 1/69; H04J 13/00

(52) U.S. Cl. .................. 370/441; 370/479; 375/136; 375/152; 375/356

(58) Field of Search .................. 370/441, 320, 370/335, 342, 479; 375/142, 145, 147, 149, 150, 152, 130, 136, 137, 143, 356, 367

(56) References Cited

U.S. PATENT DOCUMENTS

| | | | |
|---|---|---|---|
| 4,291,409 A | * | 9/1981 | Weinberg et al. |
| 5,343,496 A | * | 8/1994 | Honig et al. |
| 5,583,853 A | * | 12/1996 | Giallorenzi et al. |
| 5,760,941 A | * | 6/1998 | Young et al. |
| 6,044,083 A | * | 3/2000 | Citta et al. |
| 6,181,729 B1 | * | 1/2001 | O'Farrell |
| 6,188,714 B1 | * | 2/2001 | Yamaguchi |
| 6,226,315 B1 | * | 5/2001 | Sriram et al. |
| 6,356,555 B1 | * | 3/2002 | Rakib et al. |
| 6,442,189 B1 | * | 8/2002 | Song et al. |
| 6,456,647 B1 | * | 9/2002 | Banister |
| 6,493,376 B1 | * | 12/2002 | Harms et al. |
| 6,504,969 B1 | * | 1/2003 | Tsao et al. |

OTHER PUBLICATIONS

Zhang, Jian–Guo, Kwong, Wing C., Performance Comparison of 2^n Extended Prime Codes and Prime Codes in Fiber Optic CDMA System, 10–(22–24)–1998, ICCT, Beijing, China, Pp. (S35–08–1–S35–08–5).*

Zhang, Jian–Guo, Kwong, Wing C., 2^n Modified Prime Codes for use in Fiber Optic CDMA System, Oct. 23, 1997, Electronic Letters, vol. 33, No. 22, Pp. 1840–1841.*

Shalaby, Hossam, Mangoud, Mohab, A New Interference Cancellation Technique for Synchronous CDMA Communication Systems Using Prime Codes. 1997, IEEE, Pp. 556–560.*

Walle, Helmut "Combinatorial BER Analysis of Synchronous Optical CDMA with Prime Sequences" IEEE transactions on Communications, vol. 43, No. 12, Dec. 1995 Pp. 2894–2895.*

Holmes, Andrew S. All–Optical CDMA Using "Quasi–Prime" Codes. Journal of Lightwave Technology, vol. 10, No. 2, Feb. 1992, Pp. 279–286.*

* cited by examiner

Primary Examiner—Chi Pham
Assistant Examiner—Afsar M. Qureshi
(74) Attorney, Agent, or Firm—J. C. Patents

(57) ABSTRACT

A smart different prime code multiplexing system. Using the characteristic that two different prime codes do not interfere with each other, these two prime codes are combined to replace the conventional asynchronous division multiple access. Without affecting the user and the original data, in the original optical fiber transmission system, other users or data are dynamically added to improve the insufficient capacity of the prime code system. The decoding capacity is thus raised to achieve the objective of multiple access. Furthermore, in the invention, a synchronous parallel prime code is used to increase the original asynchronous decoding capacity. Therefore, a decoding capacity in the asynchronous system similar to that of the synchronous system is obtained. Characteristics such as ultra-high capacity and ultra-high operating speed can also be achieved.

2 Claims, 23 Drawing Sheets

Modified Prime Code Sequence for P = 7

| Group | Code Sequences |
|---|---|
| 0 | $C_{0,0}$=1000000 1000000 1000000 1000000 1000000 1000000 1000000<br>$C_{0,1}$=0000001 0000001 0000001 0000001 0000001 0000001 0000001<br>$C_{0,2}$=0000010 0000010 0000010 0000010 0000010 0000010 0000010<br>$C_{0,3}$=0000100 0000100 0000100 0000100 0000100 0000100 0000100<br>$C_{0,4}$=0001000 0001000 0001000 0001000 0001000 0001000 0001000<br>$C_{0,5}$=0010000 0010000 0010000 0010000 0010000 0010000 0010000<br>$C_{0,6}$=0100000 0100000 0100000 0100000 0100000 0100000 0100000 |
| 1 | $C_{1,0}$=1000000 0100000 0010000 0001000 0000100 0000010 0000001<br>$C_{1,1}$=0100000 0010000 0001000 0000100 0000010 0000001 1000000<br>$C_{1,2}$=0010000 0001000 0000100 0000010 0000001 1000000 0100000<br>$C_{1,3}$=0001000 0000100 0000010 0000001 1000000 0100000 0010000<br>$C_{1,4}$=0000100 0000010 0000001 1000000 0100000 0010000 0001000<br>$C_{1,5}$=0000010 0000001 1000000 0100000 0010000 0001000 0000100<br>$C_{1,6}$=0000001 1000000 0100000 0010000 0001000 0000100 0000010 |
| 2 | $C_{2,0}$=1000000 0010000 0000100 0000001 0100000 0001000 0000010<br>$C_{2,1}$=0010000 0000100 0000001 0100000 0001000 0000010 0100000<br>$C_{2,2}$=0000100 0000001 0100000 0001000 0000010 0100000 0001000<br>$C_{2,3}$=0000001 0100000 0001000 0000010 0100000 0001000 0000010<br>$C_{2,4}$=0100000 0001000 0000010 0100000 0001000 0000010 0100000<br>$C_{2,5}$=0001000 0000010 0100000 0001000 0000010 0100000 0001000<br>$C_{2,6}$=0000010 0100000 0001000 0000010 0100000 0001000 0000010 |
| 3 | $C_{3,0}$=1000000 0001000 0000001 0010000 0000010 0100000 0000100<br>$C_{3,1}$=0001000 0000001 0010000 0000010 0100000 0000100 1000000<br>$C_{3,2}$=0000001 0010000 0000010 0100000 0000100 1000000 0001000<br>$C_{3,3}$=0010000 0000010 0100000 0000100 1000000 0001000 0000001<br>$C_{3,4}$=0000010 0100000 0000100 1000000 0001000 0000001 0010000<br>$C_{3,5}$=0100000 0000100 1000000 0001000 0000001 0010000 0000010<br>$C_{3,6}$=0000100 1000000 0001000 0000001 0010000 0000010 0100000 |
| 4 | $C_{4,0}$=1000000 0000100 0100000 0000010 0010000 0000001 0001000<br>$C_{4,1}$=0000100 0100000 0000010 0010000 0000001 0001000 1000000<br>$C_{4,2}$=0100000 0000010 0010000 0000001 0001000 1000000 0000100<br>$C_{4,3}$=0000010 0010000 0000001 0001000 1000000 0000100 0100000<br>$C_{4,4}$=0010000 0000001 0001000 1000000 0000100 0100000 0000010<br>$C_{4,5}$=0000001 0001000 1000000 0000100 0100000 0000010 0010000<br>$C_{4,6}$=0001000 1000000 0000100 0100000 0000010 0010000 0000001 |

Table 1   Modified Prime Code Sequence for P=7

Modified Prime Code Sequence for *P* = 3

| Group | Code Sequences |
|---|---|
| 0 | $C_{0,0}$=1 0 0   1 0 0   1 0 0<br>$C_{0,1}$=0 0 1   0 0 1   0 0 1<br>$C_{0,2}$=0 1 0   0 1 0   0 1 0 |
| 1 | $C_{1,0}$=1 0 0   0 1 0   0 0 1<br>$C_{1,1}$=0 1 0   0 0 1   1 0 0<br>$C_{1,2}$=0 0 1   1 0 0   0 1 0 |
| 2 | $C_{2,0}$=1 0 0   0 0 1   0 1 0<br>$C_{2,1}$=0 0 1   0 1 0   1 0 0<br>$C_{2,2}$=0 1 0   1 0 0   0 0 1 |

Table 2   Modified Prime Code Sequence for P=3

FIG. 1 (Continued)
(PRIOR ART)

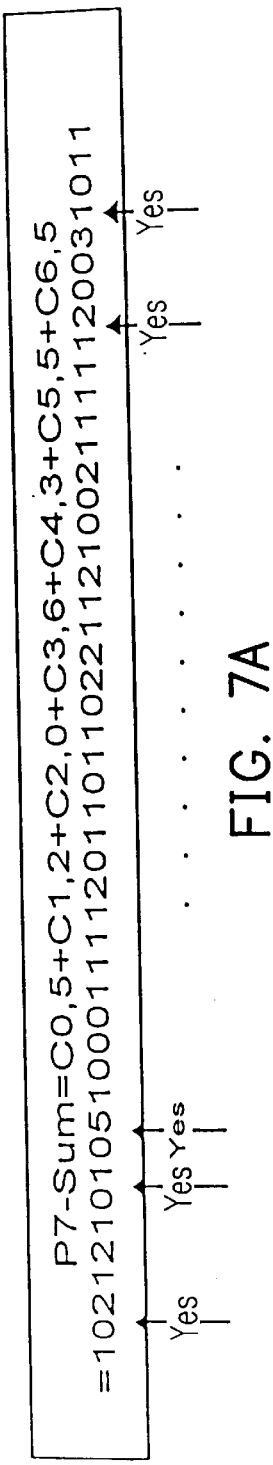
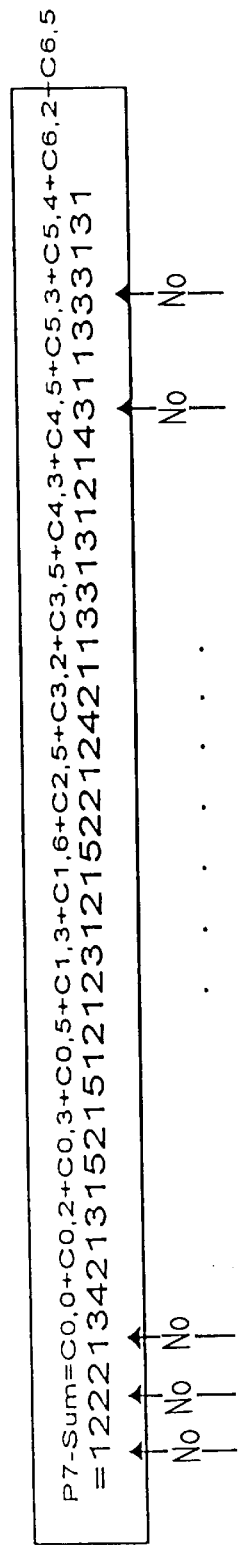
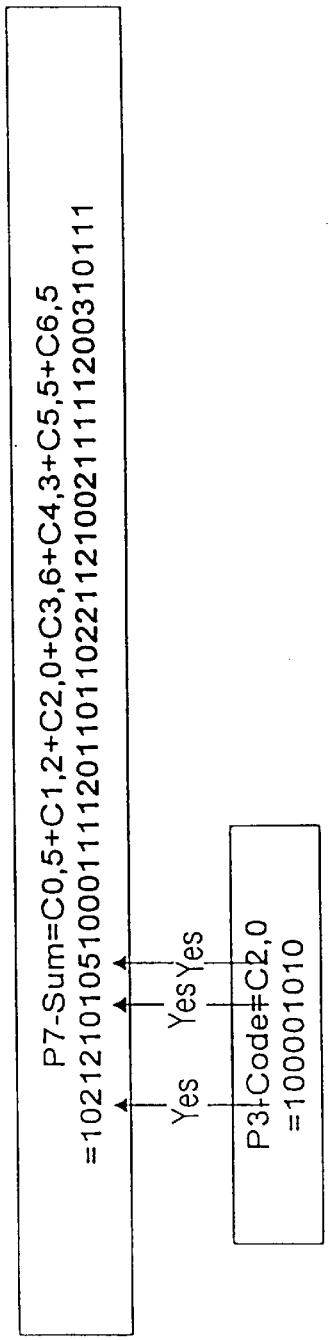
FIG. 7A
FIG. 7B
FIG. 7C

SMART DIFFERENT PRIME CODE MULTIPLEXING SYSTEM

BACKGROUND OF THE INVENTION

1. Field of the Invention

The invention relates in general to a multiplexing transmission system, and more particularly, to a smart different prime code multiplexing system

2. Description of the Related Art

To increase the capacity of an optical fiber communication system, conventionally, a time division multiplexing (TDM) is operated. However, due to the bandwidth limitation of the optical fiber, the wavelength division multiplexing (WDM) is more developed to replace the time division multiplexing. In the wavelength division multiplexing, a wave coupler is used to input each channel signal with various wavelength to each optical fiber. The receiver then outputs to each channel via an optical demultiplexer.

Lately, the technique of the conventional code division multiplexing access (CDMA) system has been widely discussed and studied. Using modifying prime code (referring to FIG. 1, the $P_7$ and $P_3$ modified prime code) as a decoding method, there are only P sets (P is the selected prime) of decoding capacity in the asynchronous code division multiple access (A/CDMA). In contrast, in the synchronous code division multiple access (S/CDMA) system, there are $P^2$ sets of decoding capacity. However, the application of the division multiple access system to the optical fiber system decoder is still insufficient.

In the synchronous code division multiple access system, after spreading the codes of data, the synchronous state of each chip can distinguishes more prime codes. For example, using the $P_7$ code as an example, there are only 7 codes ($P_7$=7) can be distinguished in an asynchronous system. In contrast, there are 49 codes ($p_7^2$=49) to be distinguished in the synchronous system. Providing a data transmission speed of 10 G/sec, the $P_7$ code spreads the data transmission speed into a chip rate of 490 G/sce. It is a difficult task to achieve such an ultra high synchronous speed in an optical fiber.

In an asynchronous code division multiple access system, since the optical decoder does not contain any synchronous data, only P types of different prime codes are distinguished. That is, there are only P sets of decoding capacity that enables only P users to get access with an identical transmission channel.

In the above synchronous code division multiple access system, since the optical fiber contains synchronous data, $P^2$ kinds of different prime codes are thus accessed. As a consequence, there are $P^2$ sets of decoding capacity to enable $P^2$ users to get access into an identical channel. In this manner, though the capacity is increased, a synchronous operation has to be achieved. The design to perform the synchronous operation is difficult and the hardware thereof is complex. For the design of the practical application in optical communication system decoder, the synchronous operation is even more difficult.

For example, in a conventional asynchronous system, while transmitting the spreading data by the asynchronous prim code, a technique of delay line in the decoder at the receiver is used to determine the threshold. Whenever the threshold is exceeded, the decoding operation is successfully fulfilled, and the required data are extracted. Referring to FIG. 2, in the synchronous system, a decoder of a receiving terminal 10 uses the technique of delay line 20 to determine the threshold 30. Meanwhile, a sampling time 40 synchronous to a transmitting terminal is set up. Only with certain sampling time 40, a determination whether the threshold 30 is exceeded is performed.

After prime code spreading of the data, the chip is greatly expanded (for example, with $P_7$ code, one bit of data can be spread into 49 chips as shown in FIG. 3). The expansion is more obvious when the prime code is larger, especially for a high speed transmission, it is difficult to set up a sampling time to achieve a synchronous operation. This is the most challenge of the synchronous system.

SUMMARY OF THE INVENTION

The invention provides a smart different prime code multiplexing transmission system. Two different prime codes without interfering with each other are used and combined to replace the conventional asynchronous code division multiple access system. In the original optical fiber transmission system, additional users or data are dynamically added to improve the drawback of insufficient capacity of the prime code system, so as to increase the decoding capacity to achieve the objective of multiple access.

In the invention, a quasi synchronous parallel prime code is provided. By combining different prime codes, the asynchronous decoding capacity can be used, still in an asynchronous system, with a decoding capacity similar to that of a synchronous system. Moreover, an ultra-high capacity and an ultra-high operation speed are achieved.

In the method of operating the smart different prime code multiplexing transmission system, a prime code system is used. A monitoring system is assembled according to a first prime code system to select a second prime code system. When the monitoring system adds the second prime code system, the different prime code multiplexing transmission is operated according to the first prime code system and the second prime code system.

The smart different prime code multiplexing system provided by the invention comprises an optical decoder array, multiple opto-electronic converters, a channel occupied sensor, a slot occupied sensor, an overload decision device, an insert process unit, an insert control unit, and a different prime code decoder. The optical decoder array is used to extract a first prime code signal and to determine the operating status of multiple channels in an optical fiber. The opto-electronic converters are coupled to the optical decoder array to convert the optical signal of the operating status of the channels into an electronic signal. The channel occupied sensor are coupled to the opto-electronic converters to sense whether the channels are under the occupied or the empty states. The slot occupied sensor is coupled to the channel occupied sensor to reconstruct the first prime code signal in the optical fiber. The overload decision device is coupled to the channel occupied sensor to numerate the occupied channels. While the number of the occupied channels reaches a pre-determined value, a pre-determined signal is output. The insert process unit is coupled to the slot occupied sensor and the overload decision sensor. The insert process unit determines whether a second prime code signal can be inserted according to the first prime code signal and the predetermined signal. While it is permissible, an admitting signal is output thereby. The insert control unit is coupled to the insert process unit to receive the admitting signal. The admitting signal is then spread by the second prime code signal. The insert control unit is further coupled to the optical fiber. The different prime code decoder is coupled to the optical fiber to produce an output signal according to the second prime code signal.

A quasi synchronous code structure is also provided in the invention. The quasi synchronous code structure comprises different first prime code and second prime code. The coding method is between synchronous and asynchronous. The decoding capacity is similar to that of the synchronous system, while the structure can be applied to an asynchronous system.

The invention further provides a coding method. The data are coded into a second prime code using delay line technique. A data delay time with response to the second prime code is coded into a first prime code using delay line technique. The second prime code and the first prime code are coupled with each other by a coupler, so that a quasi synchronous code.

In another coding method of the invention, a first threshold and a second threshold are selected. After receiving a quasi synchronous code, the first and the second prime thresholds are input to individual decoded code using delay line technique, so as to decide whether the first threshold and the second threshold are exceeded. While individually coupling the first and the second thresholds, the phase shift of the thresholds is compensated. These two thresholds are coupled by a coupler and input to a threshold decision device. When the threshold decision device determines a signal, the received quasi synchronous code is converted into data to be output.

Both the foregoing general description and the following detailed description are exemplary and explanatory only and are not restrictive of the invention, as claimed.

BRIEF DESCRIPTION OF THE DRAWINGS

Figure 1:
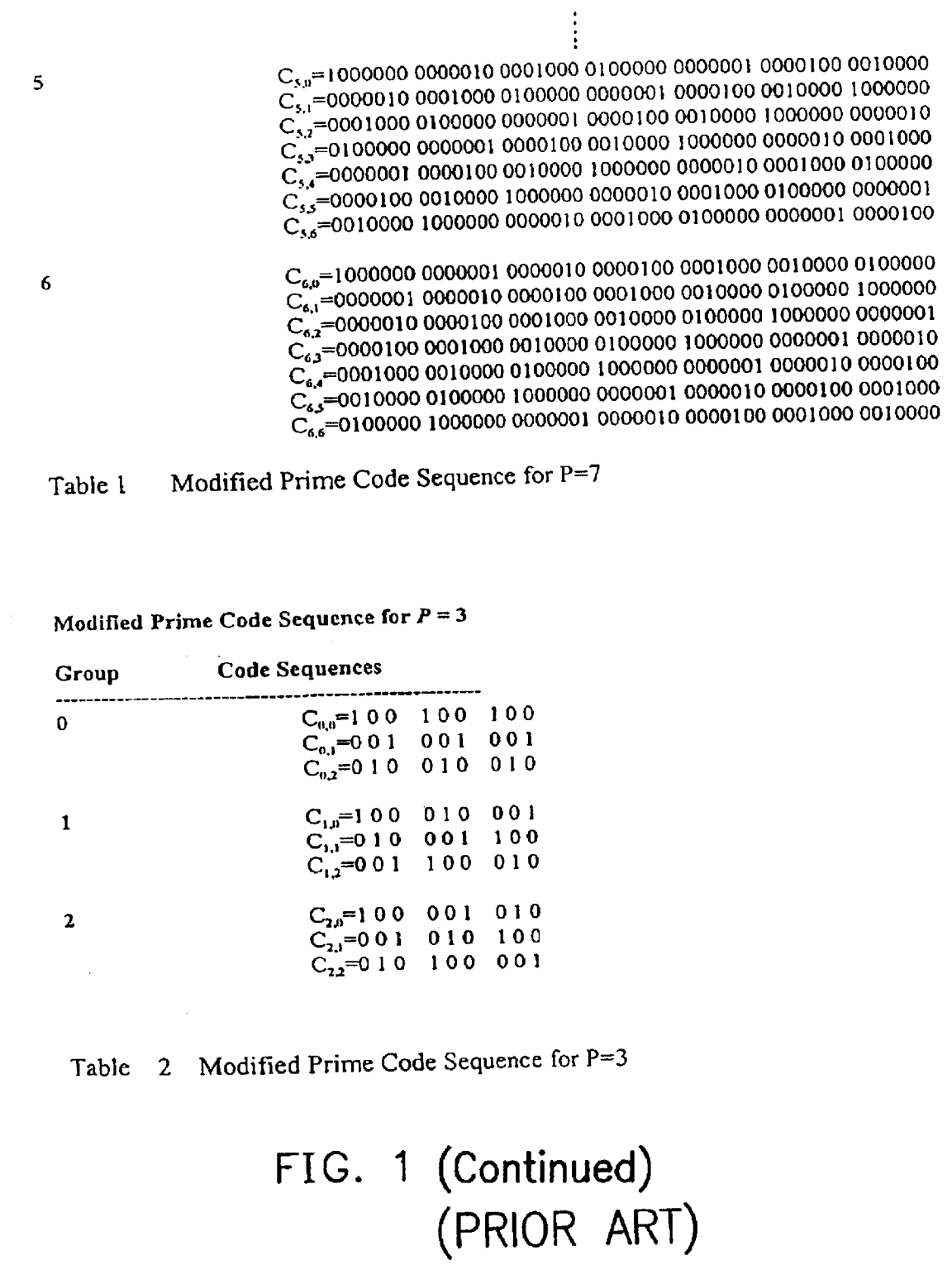

FIG. 1 shows a conventional modification of prime code for $P_3$ and $P_7$;

FIGS. 7A, 7B and 7C are models of optimal design algorithm;

DESCRIPTION OF THE PREFERRED EMBODIMENTS

Due to the anti-interference property and the increased system capacity, CDMA technique has become a leading trend of the new generation of the communication system. The CDMA has been widely applied in wireless and optical fiber communication. In recent years, it is even applied to the multi-medium transmission. It is observed that in the CDMA environment, the codes with different lengths can conditionally coexist. In the receiving terminal, certain part of the codes can still be distinguished, and thus, establishes the basis of the code division multiplexing system of different prime code and different prime code multiplexer. The invention focuses on a CDMA environment to form a structure of different prime code system with the codes of various lengths. As a consequence, drawbacks such as insufficient coding capacity can be resolved. The number of users can be increased, and application of the different prime code multiplexer and system capacity can be enhanced.

In the multiplexing system, a novel code distinguishing multiple extracting system and an optimal design method are designed to improve the integral capacity. In an original $P_L$ prime code system (a first prime code system), $P_S$ different prime code system (a second prime code system) is disposed such that $P_L$ and $P_S$ representing different prime are co-existent and being transmitted. A compatible transmission condition is obtained to enable two different kinds of data or different users to spread the different prime codes without a mutual interference whilst the objective of transmission is achieved. In addition, the multiplexing hardware can also be designed with the same manner.

Figure 2:
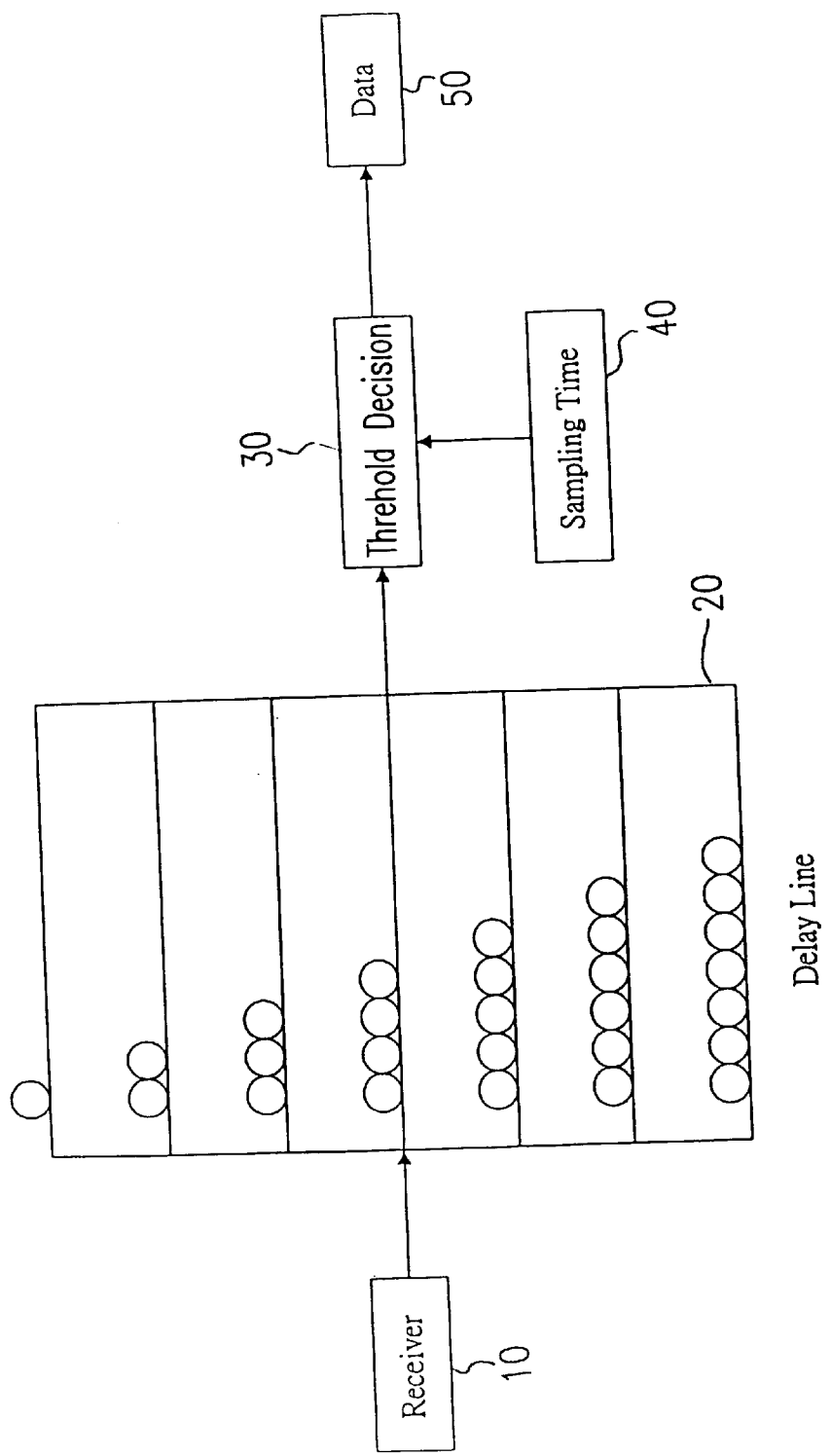
FIG. 2 shows a decoding block diagram of in a conventional synchronous system.
Figure 3:
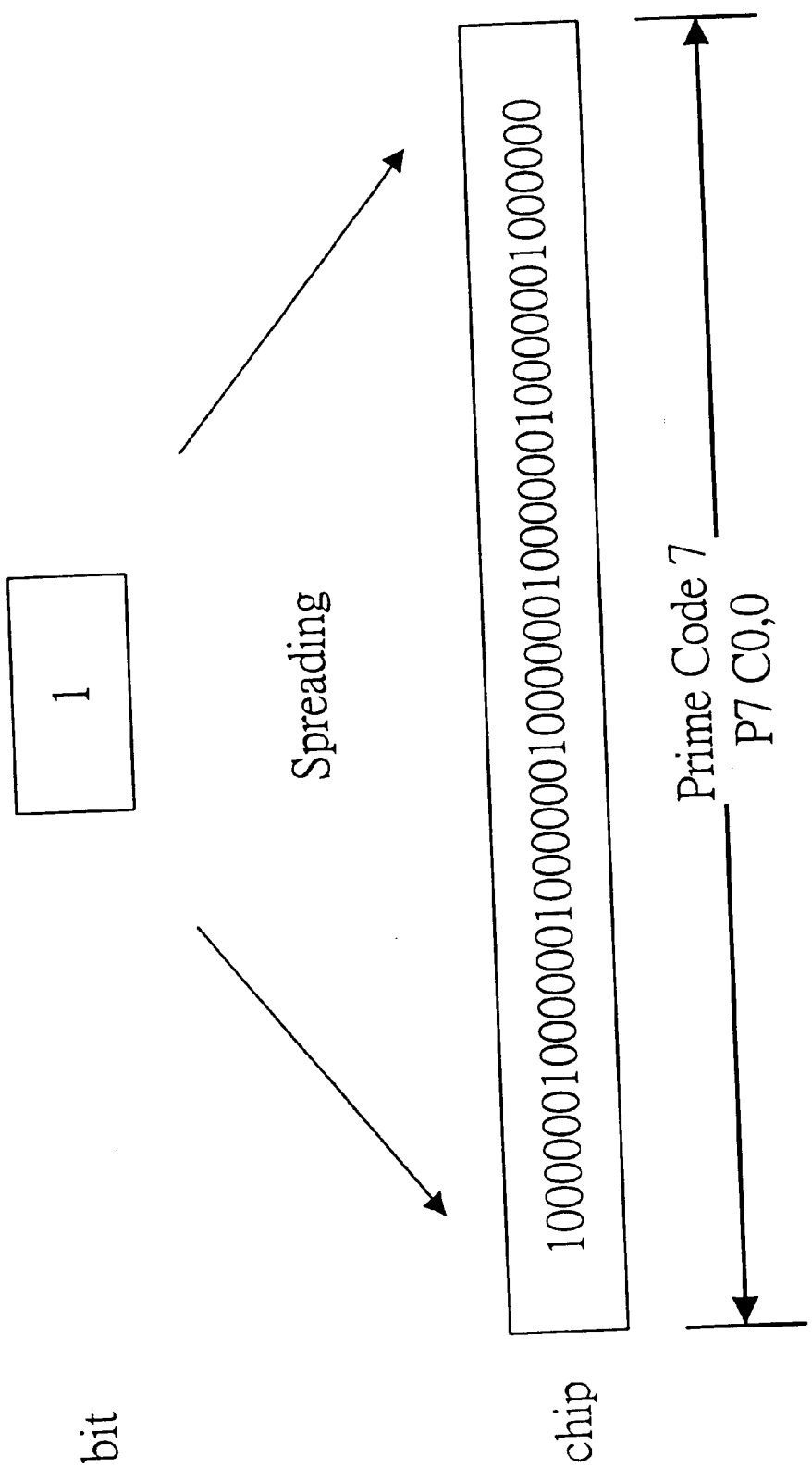
FIG. 3 shows a diagram of conventional data spreading.
Figure 4:
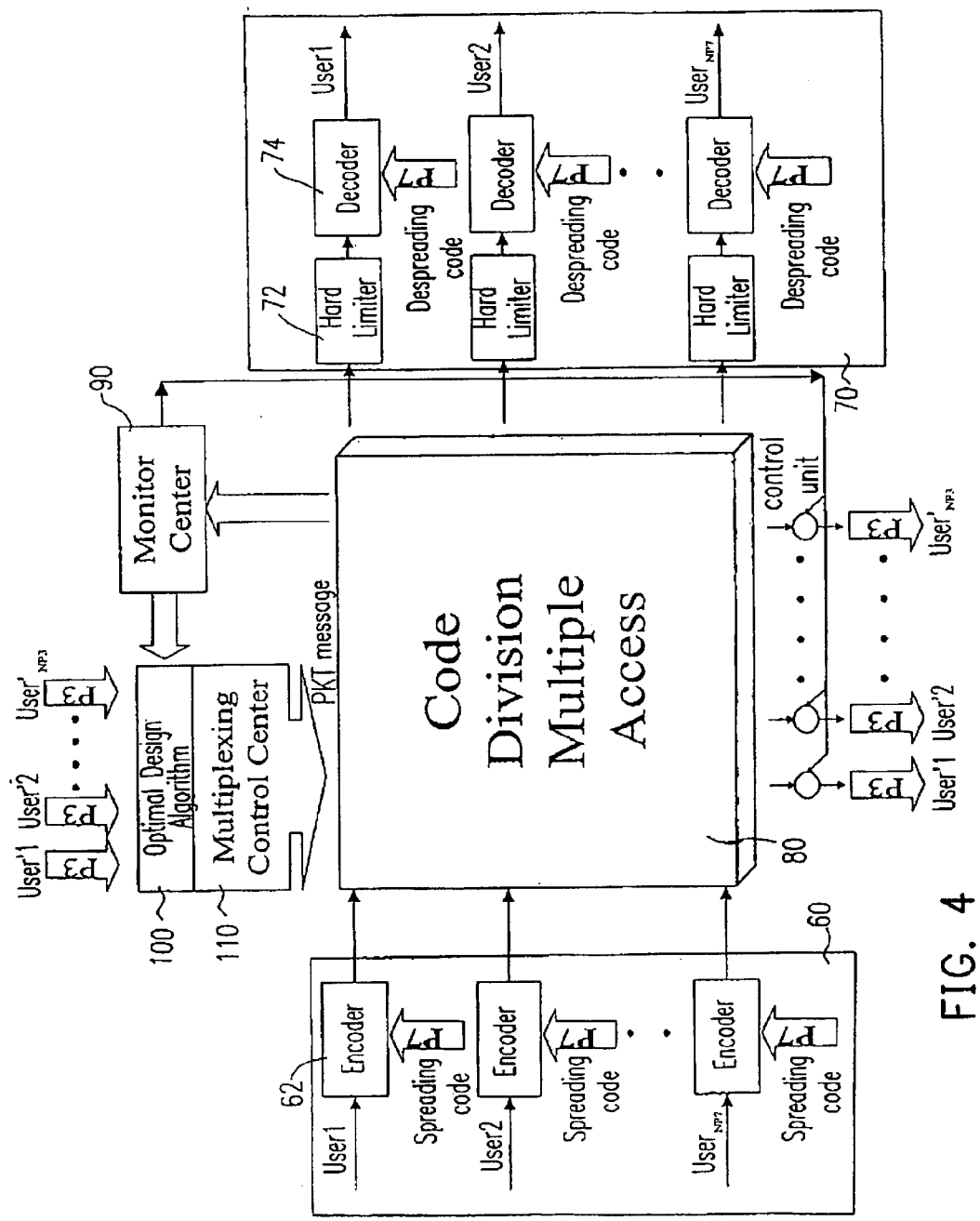
FIG. 4 shows a block diagram of a smart different prime code multiplexing transmission system according to an embodiment in the invention.

FIG. 4 shows a block diagram of a smart different prime code multiplexing system according to the invention. A combination of $P_7$ and $P_3$ are used as an example, there are NP7 users (simultaneous usage capacity), User1, User2, . . . and User $_{PN7}$. Each of the users uses the $P_7$ prime code as the spreading code of the decoder 62 at the transmitting terminal 60. Via the CDMA system 80, a signal to be received at the receiving terminal 70 is going through a hard limiter 72. Using the $P_7$ prime code as the decoder 74 in the receiving terminal 60, the signal is despread. Meanwhile, the monitor center 90 is monitoring the CDMA system 80. While the $P_7$ code assemble can be inserted with some $P_3$ prime codes, the monitor center 90 can thus perform optimal design algorithm 100 on the $P_3$ code to achieve optimization, so as to transmit to a multiplexing control center 110. Thus, additional users User'1, User'2, . . . , User'$_{NP3}$ are thus allowed to transmit different kinds of data, and the capacity of the integral system is thus increased. A detailed description of the monitor center 90 and the multiplexing control center 110 is further given in the following paragraphs.

Figure 5:
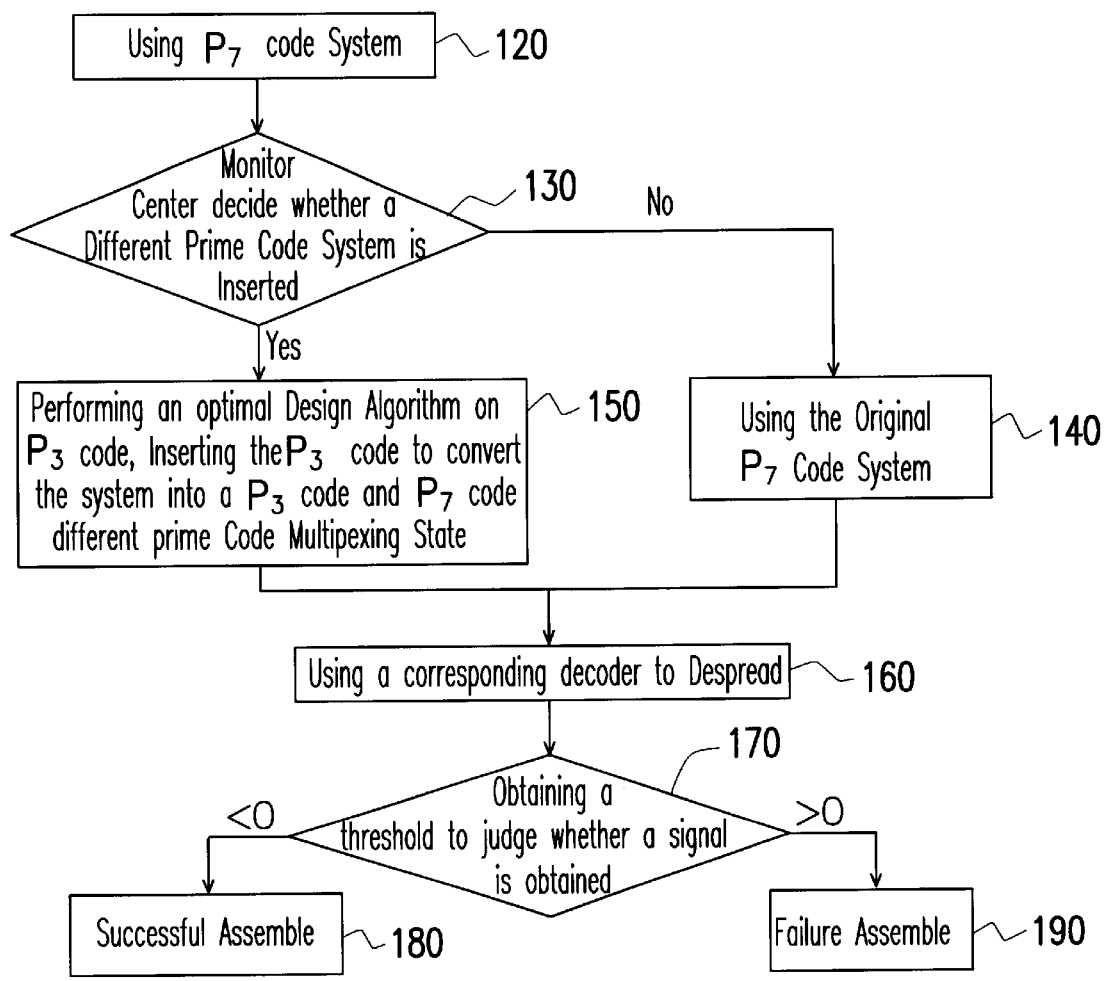
FIG. 5 shows a system process flow of the smart different prime code multiplexing transmission system according to an embodiment in the invention.

According to the system process flow of the smart different prime code multiplexing transmission system as shown in FIG. 5, an example using $P_S$=3 and $P_L$=7 are taken. For the coexistent capacity of the different prime codes of the integral system, the design method of distinguishing multiple extracting technique via different prime code system and optimal design algorithm:

(1) Normally operating the $P_7$ code system 120; the multiplexing transmission system is transmitted by the $P_7$ code under normal condition.

(2) The monitor center decides whether the different prime code system 130 can be inserted. Whether the different prime code system (that is, $P_3$ code system) can be inserted is determined by the monitor center 90 according to the currently used assemble of the $P_7$ code.

(3) If the different prime code cannot be inserted, the original $P_7$ code system 140 is used.

(4) If a different prime code system can be inserted, an optimal design algorithm is performed on the $P_3$ code which is further disposed input via the multiplexing control center to convert into the $P_7$ and $P_3$ different prime code multiplexing state 150. The insertion of the $P_3$ code into the original single prime code system via the multiplexing control center thus forms a system coexisted with both $P_3$ code and $P_7$ code. The whole system therefore enters a different prime code multiplexing state to allow the entry of additional users.

(5) Using corresponding decoder to despread 160.

(6) Obtaining a threshold to judge whether a signal is obtained 170.

Thus, once the $P_7$ code is selected, under the circumstance for not affecting the original code system transmission, the $P_3$ code is inserted into the most appropriate position to achieve the objective of increasing the capacity without a mutual interference.

Figure 6:
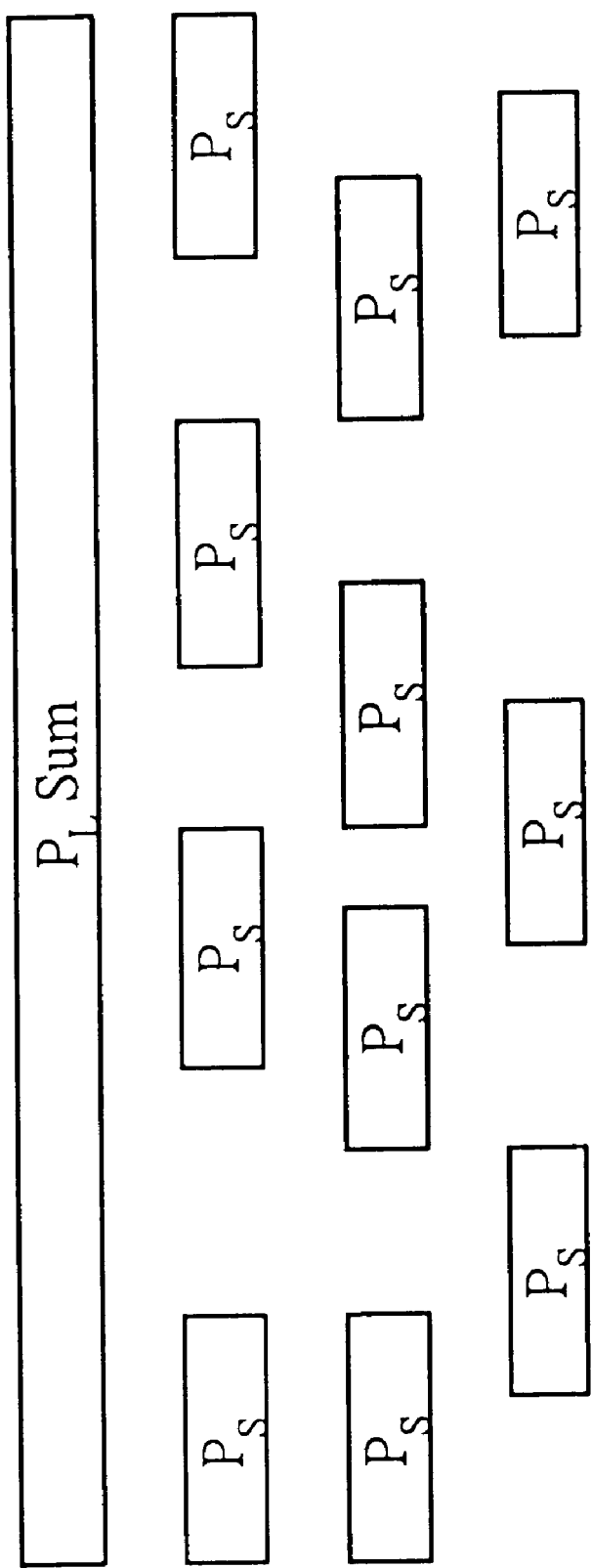
FIG. 6 shows that the position for dynamically inserting the $P_3$ code is a slot inserting method.

In FIG. 6, the method for dynamically inserting the $P_3$ code includes a slot insert method. In this slot insert method, the position to be inserted with the $P_3$ code is dynamically controlled. Thus, in different condition, the inserted position for coexisting different prime codes is not fixed. The different prime code to be inserted is variable, and the different prime code that can coexist is also variable. That is, the different prime codes are not exactly aligned with each other. In contrast, some parts of the different prime codes may overlap, while some parts of the different prime codes may stagger.

FIGS. 7A, 7B and 7C shows a model of optimal design algorithm.

A sum of an assemble of 7 selected $P_7$ codes is observed to improve the whole different prime code insertion method and effective decoding process:

(a) A $P_3$ code is inserted into a sum of $P_7$ codes. There must be a "zero" in the sum of the $P_7$ codes. On the contrary, while the sum comprises a "0", it does not mean that the $P_3$ code can be inserted. Therefore, as shown in FIG. 7A and FIG. 7B, one can only increase the search speed by searching the possible positions where the different prime code may be inserted.

(b) FIG. 7C shows a model of optimal design algorithm. While inserting the $P_3$ code into the original system, if the corresponding sum of the position for $P_3$ code is 0 or larger than 2, the $P_3$ code can be inserted. On the contrary, if the position for $P_3$ code equal to 1 corresponds to a position of the sum of 0 or larger than 2, the $P_3$ code can be inserted. On the contrary, if the position for $P_3$ code equal to 1 corresponds the position of 1 for the sum, the $P_3$ code cannot be inserted. Therefore, the decoding time can be shortened to enhance the integral performance, and the speed of inserting different prime code is increased.

Figure 8:
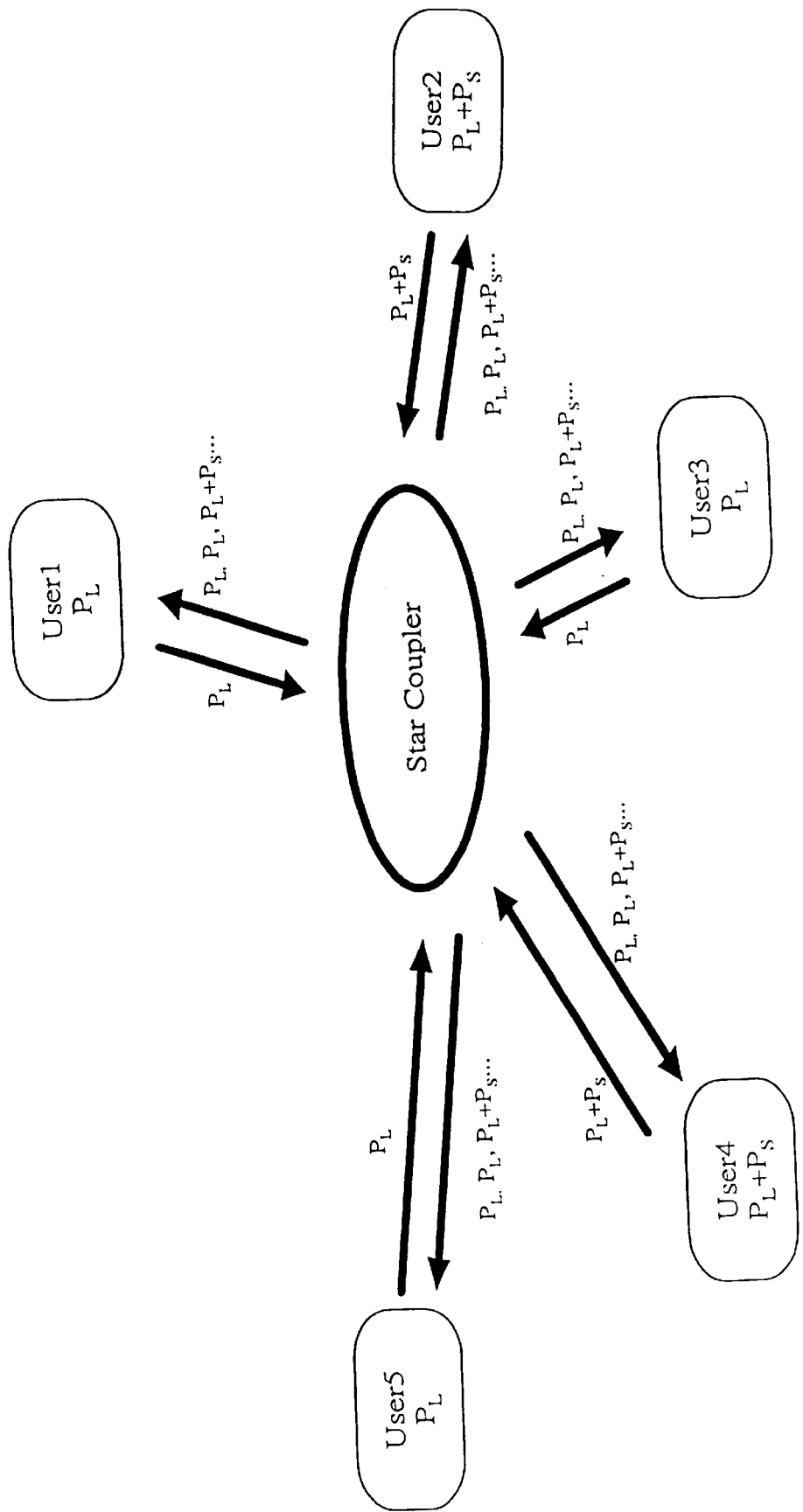
FIG. 8 shows a different prime code multiplexing transmission system.

In the whole optical fiber communication net, the user group originally uses $P_L$ ($P_L$) is a prime) as the spreading code for transmission. That is, to perform data transmission and reception, the corresponding $P_L$ prime code is in use. After the addition of the multiplexer, the whole system, that is, the different prime code multiplexing transmission system as shown in FIG. 8, can be inserted with $P_S$($P_S$ is a prime) code. Assuming that there are five users in the whole net, two users, User2 and User4, inserted with the different prime code multiplexer ($P_L+P_S$) are able to achieve multi-media transmission by the utilization of multiplexer for transmitting different data.

Figure 9:
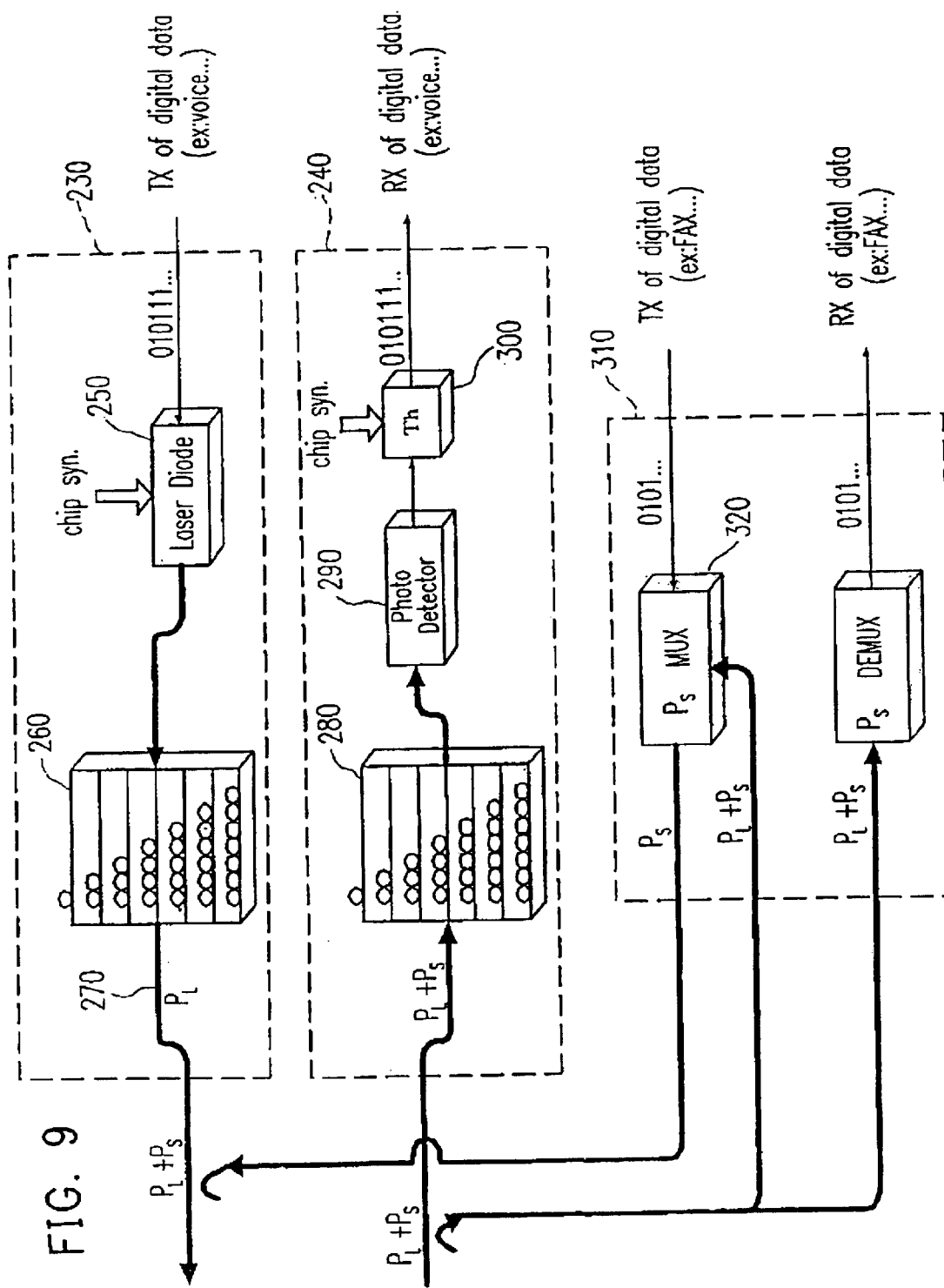
FIG. 9 shows a multiplexer.

In FIG. 9, a multiplexer is shown. The original user in the communication net uses the digital data (such as voice) to trigger a laser diode 250 in the primary transmitter 230/receiver 240. Through the delay line logic 260, the digital data are properly delayed and coded as a prime code $P_L$ with a prime index of L. The prime code $P_L$ is then coupled to the optical fiber 270. Meanwhile, in the receiving terminal, after the corresponding delay line logic 280 and the photodetector 290, a threshold 300 at a proper position is determined according to the chip synchronous signal (Chip Syn.) of the receiving terminal. If the threshold is equal to the prime index L, the data are decoded as 1, whilst the threshold is smaller than the prime index L, the data are decoded as 0.

In the different prime code multiplexing state, a secondary transmitter/receiver 310 is inserted. That is, the original system is inserted with a smart different prime code multiplexer 320. The multiplexer automatically detects the state of usage in the transmission channel. While there are only a few users, the multiplexing state is automatically entered to allow different kinds of data to be transmitted. The data can also be converted by the decoding multiplexer 330 to achieve the objective of multi-media transmission. For example, when the main system is transmitting a voice, the multiplexer may simultaneously fax to other users while the channels are not busy. In FIG. 9, the thick solid line, the thin solid line and the dash line respectively represent the optical signal, the electronic signal and the control clock.

Figure 10:
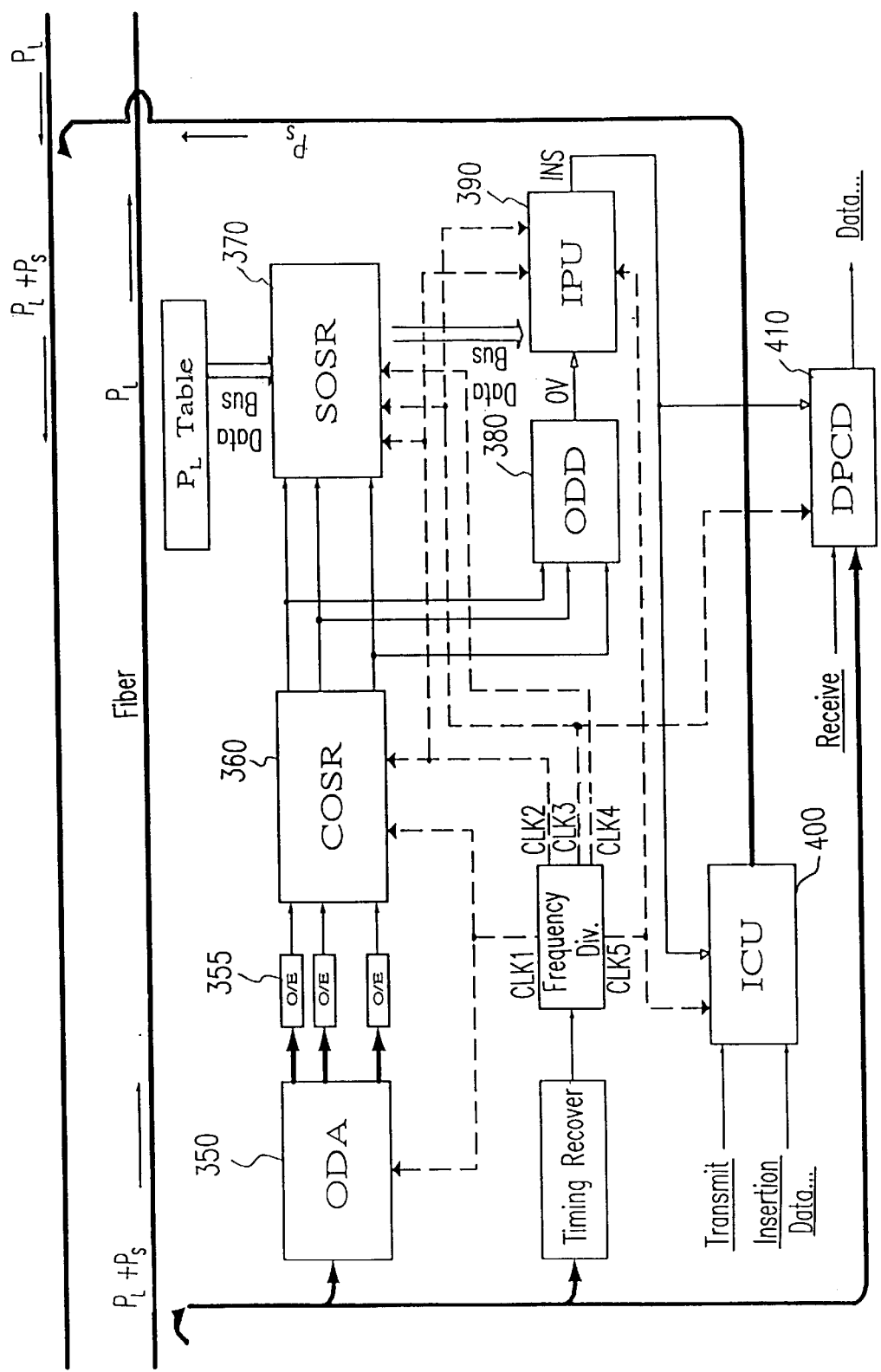
FIG. 10 shows a design of the smart different prime code multiplexing transmission system provided by the invention.

In FIG. 10, a design of the smart different prime code multiplexing transmission system is drawn. According to the aforementioned model of the optimal algorithm, the hardware of the smart different prime code multiplexer is designed. The dash line represents the clock of each control unit to control the action or synchronization of each unit. The solid line uses the optical signal as the transmission medium. The thin black line represents the transmission medium of the electronic signal. The original data in the optical fiber is coupled to the optical decoder array (ODA) to decode the number of users occupying the channel. After the opto-electronic converters 355, the number is input to the channel occupied sensor (COSR) 360. After observing for a period of time, the occupied $P_L$ codes to be occupied can be determined. The occupation of the slot can further be realized using the slot occupied sensor (SOSR) 370. The overload decision device (ODD) 380 is used to decide whether the users occupying the channel are too many according the results obtained by the channel occupied sensor 360. If the channel is busy, the multiplexing state is automatically terminated to enter a state of transmitting the $P_L$ prime code only. If the channel is not busy, different prime code multiplexing state is entered. In the following step, according to the insert process unit (IPU) 390, an optimal algorithm can be performed by a simple logic structure. The synchronization of the insert control unit (ICU) 400 and the insert process 390 (since two control units using an identical clock (CLK5)), the position to insert the different prime code is determined. Additional data are re-coupled into the optical fiber via the coding laser in the insert control unit 400. While decoding, similar method to detect the position and types of the prime codes is used. Using the different prime code decoder (DPCD) 410, a corresponding prime code is decoded to complete the multiplexing process. The action of each device is further described hereinafter.

Figure 11:
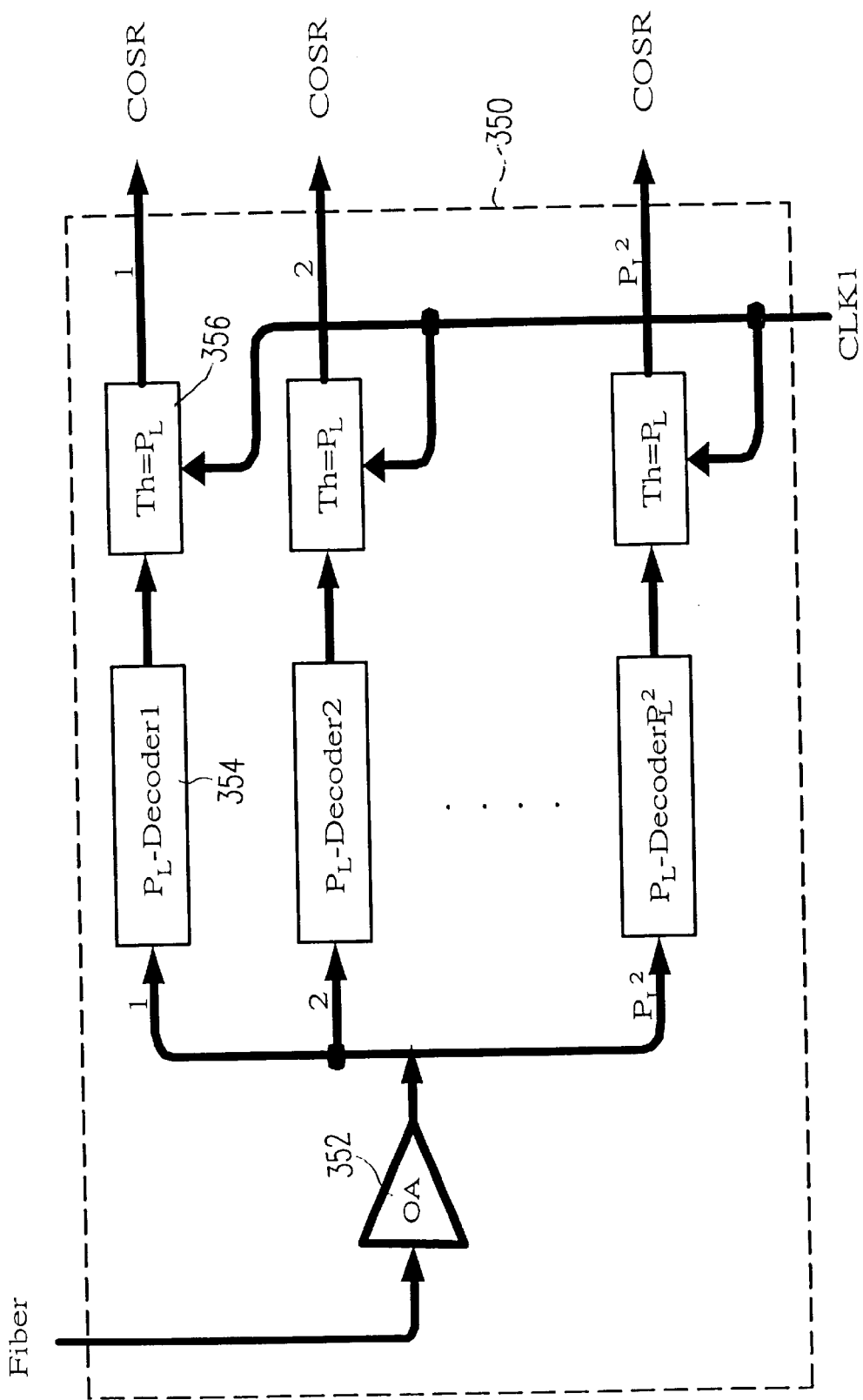
FIG. 11 illustrates the optical decoder array.

ODA 350: Referring to FIG. 11, to achieve the objective of smart multiplexing, that is, to enable the multiplexer to automatically detects the current using state of the optical fiber, a current sum is coupled from the optical fiber. The sum is amplified by an optical amplifier 352, followed by inputting into $P_L^2$ decoders 354. At a proper synchronous time mode, a threshold 356 is obtained.

The smart different prime code multiplexer includes a characteristic of automatically detects the using state of the communication channels. To achieve this function, the optical decoder array 350 of the multiplexer couples a sum out of the optical fiber, through the decoder 354 of the decoder array. After determining the threshold 356 at a proper synchronous time (Chip Syn.), the occupancy state of the channel is obtained. The sampling time is determined by CLK1, and CLK1=$P_L^2 \times T$(sec). The signal has to travel through the optical amplifier first to amplify the energy thereof. Since there are $P_L^2$ decoders, the energy is distributed into each decoder with a magnitude of $1/P_L^2$ of the original energy. The delay line in each decoder 354 further disperses the energy into $1/P_L$. The amplification is thus G=$P_L^2 \times P_L$.

Figure 12:
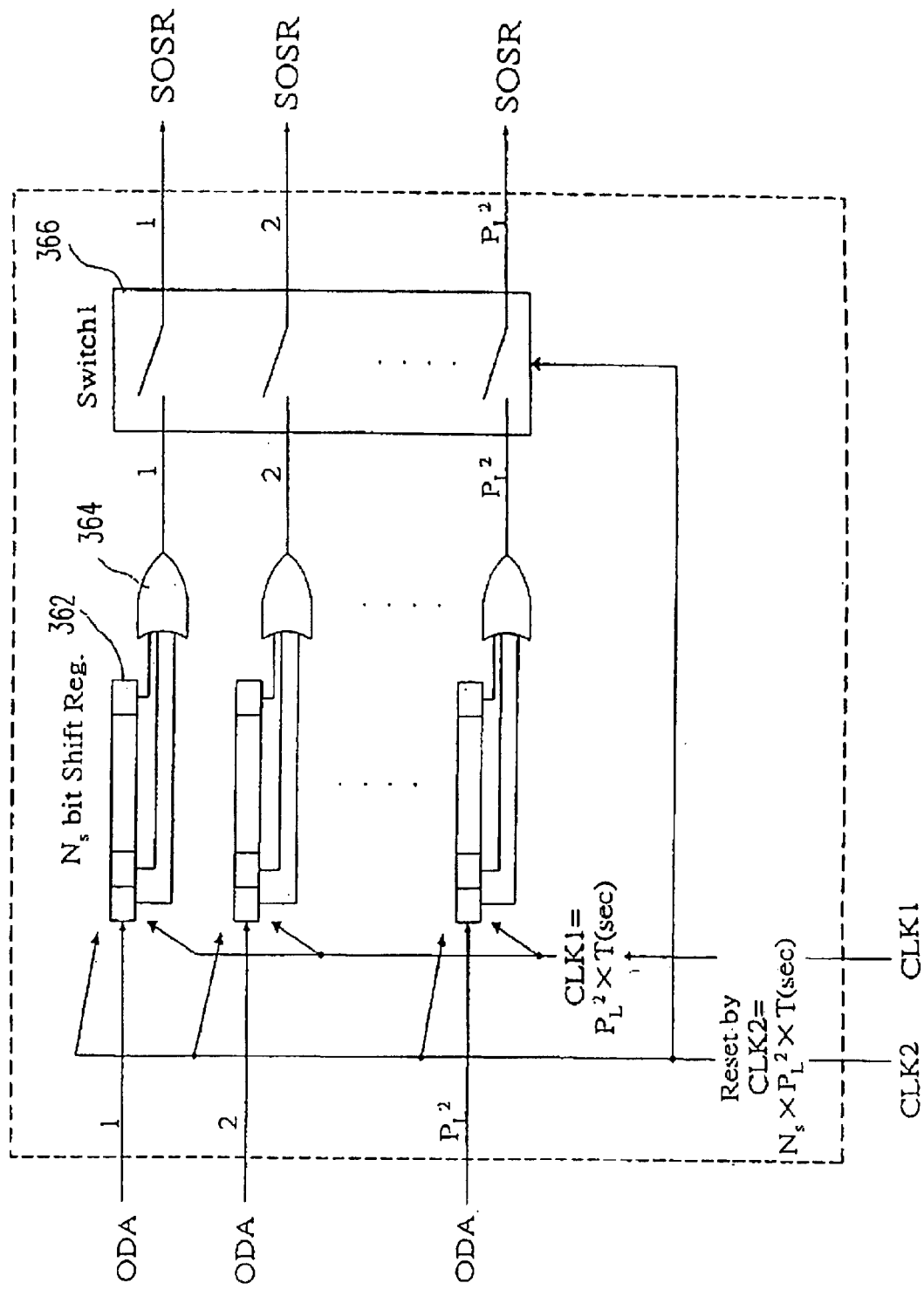
FIG. 12 illustrates the channel occupied sensor.

COSR 360: Please referring to FIG. 12. It is possible that currently there are a few users with a transmission data equal to 0, so that the prime code spreading is not performed. Meanwhile, the previous optical decoder array may mistakenly make a judgement that there is no user currently. Therefore, the channel occupied sensor 360 is designed. According to the number of users resolved by the optical decoder array 350, $N_S$ bit is observed ($N_S$ bit is determined according to specific requirement, and an $N_S$ bit shift register 352 is used for the receiving operation), the actual number of users in $P_L$ prime code is determined. That is, when any 1 of the $P_L$ prime code is used in the $N_S$ bit registers 352 by the user, the OR gate 364 can observe. On the contrary, if the user does not have any 1 of the $P_L$ prime codes to be spread in the $N_S$ bit, an error result may be caused. When the transmission data for each user is considered to be zero by the channel occupied sensor 360, the optical decoder array cannot correctly judge the existence of the user, thus causes an error judgement. Therefore, while designing the channel occupied sensor 360, the data obtained in the optical decoder are written into $N_S$ bit register 362. With the same control signal of CLK1, the data are shifted toward right once and each $N_S$ bit is reset once to restart sensing. If the mistaken judgement happens, it must be the situation that each bit of the data is zero, and this is the very rare case. The length $N_S$ is determined according to specific requirement. The larger the $N_S$ is, the higher the cost is. However, the larger $N_S$ results in a higher precision for judgement. In each CLK1 cycle ($P_L^2 \times$Tsec), the signal sent from the ODA 350 is all sent to the $N_S$ bit register 352. Using the OR gate 364 to judge whether there is a signal, and resetting the $N_S$ bit register 352 at a CLK2 cycle ($N_S \times P_L^2$Tsec), the switch 366 is reset to output the signal of channel occupancy.

Figure 13:
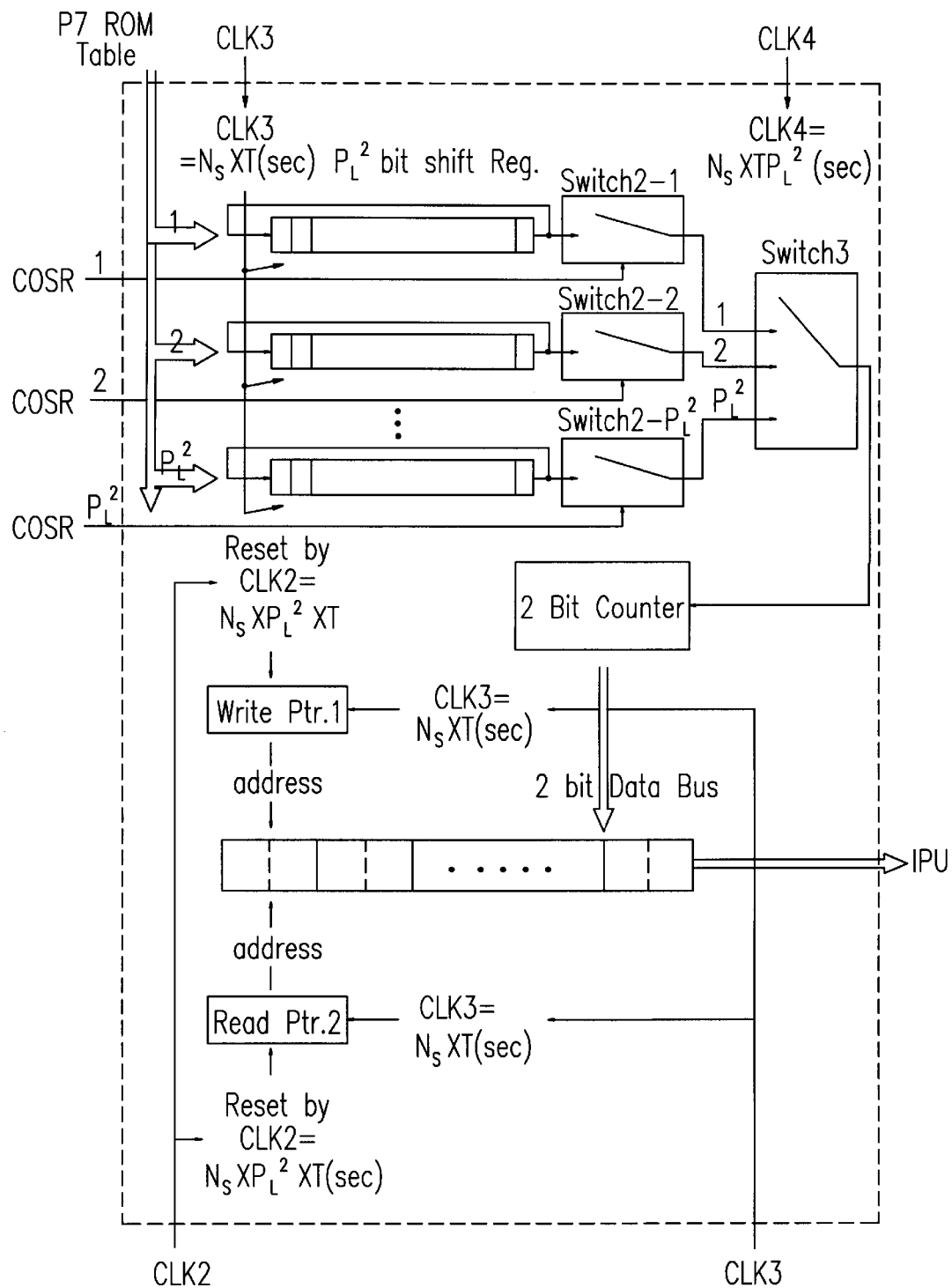
FIG. 13 illustrates the slot occupied sensor.

SOSR 370: Referring to FIG. 13, by the channel occupied sensor 360, the actual used $P_L$ prime code of the channel is detected. By the slot occupied sensor 370, the sum corresponding to the reconstruction of the $N_S$ bit is written into a register. Using the data of P7 ROM Table (the ROM for storing P7 prime code), the $P_L^2$-bit shift register 372 is initialized. Once bit is to be shifted each time, and is to be fed back to the first bit. By the aforementioned user, after the sampling time of CLK4=$N_S \times T/P_L$sec, a two bit counter rebuilds a complete sum to be written to a $P_L^2 \times 2$ bit register 376. The register may have four possible conditions, when two registers are treated as a set: and while chip is 0, the register is 00; if the chip is 1, the register is 01, if the chip is 2, the register is 10, and if the chip is 3 (3, 4, 5 . . . ), the register is 1 1. This is a step to judge whether the sum includes the existence of 2. If 2 is existent, the P3 prime code cannot be inserted. On the contrary, if 2 does not exist, the different prime code multiplexing can be performed.

Figure 14:
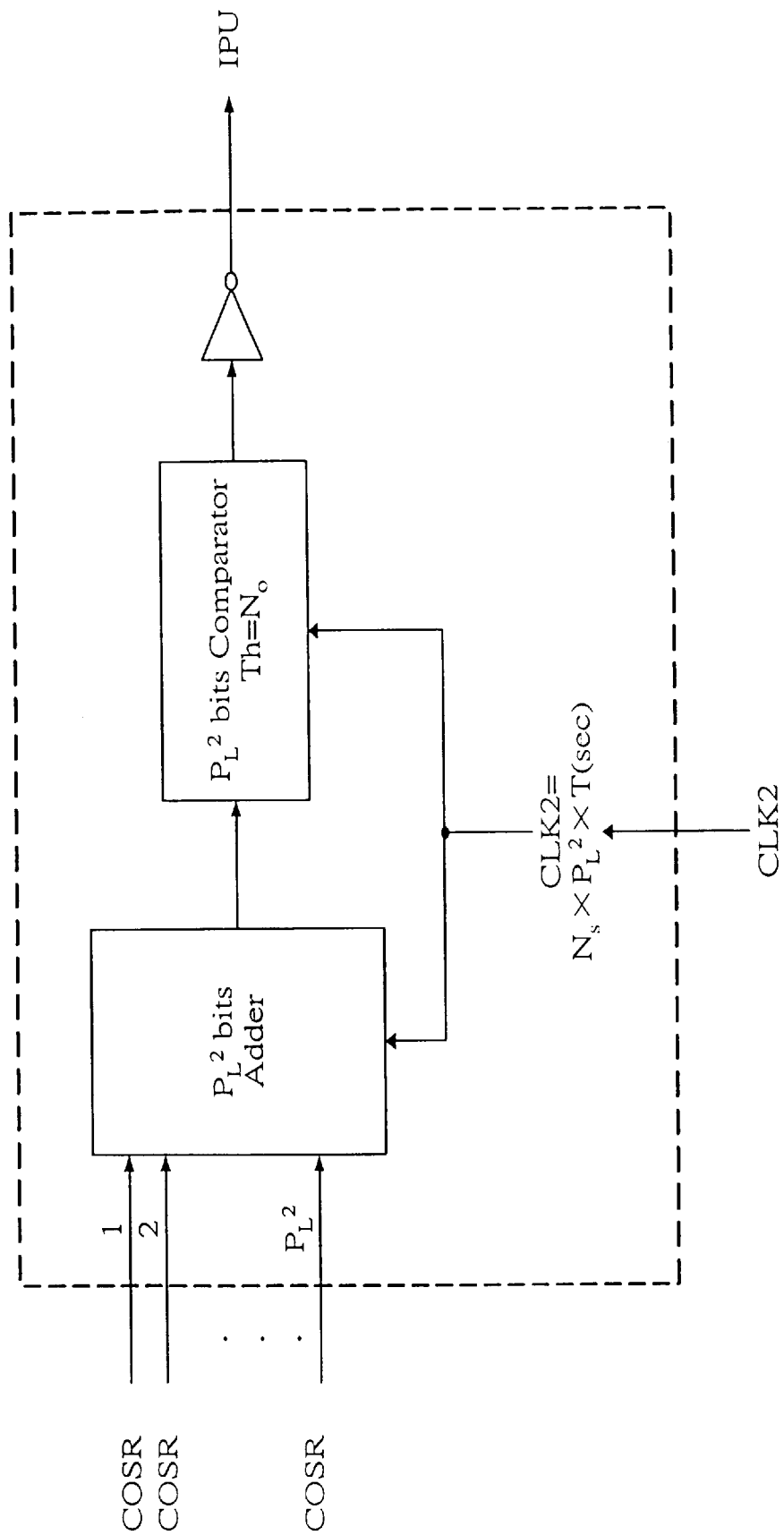
FIG. 14 illustrates the overload decision device.

ODD 380: Referring to FIG. 14, under normal communication condition, the users are not a lot, the multiplexer can automatically detects the channel usage situation (using $P_L^2$ bit adder 382 to calculate) to dynamically insert additional prime code. However, when the users are increased suddenly, the overload decision device 380 starts to decide whether the channel is busy according to the number of users resulted from the channel occupied sensor 360 and the predetermined $N_o$. $N_o$ can be determined according to specific requirement. The larger the $N_o$ is, the less the channel is limited, that is, the more condition that the multiplexing can be performed. However, the performance to protect from the suddenly increased number of users is limited. To maintain the normal operation of the communication users, the overload decision device is used. The overload decision device outputs a predetermined signal to refuse the entrance of multiplexing state.

Figure 15:
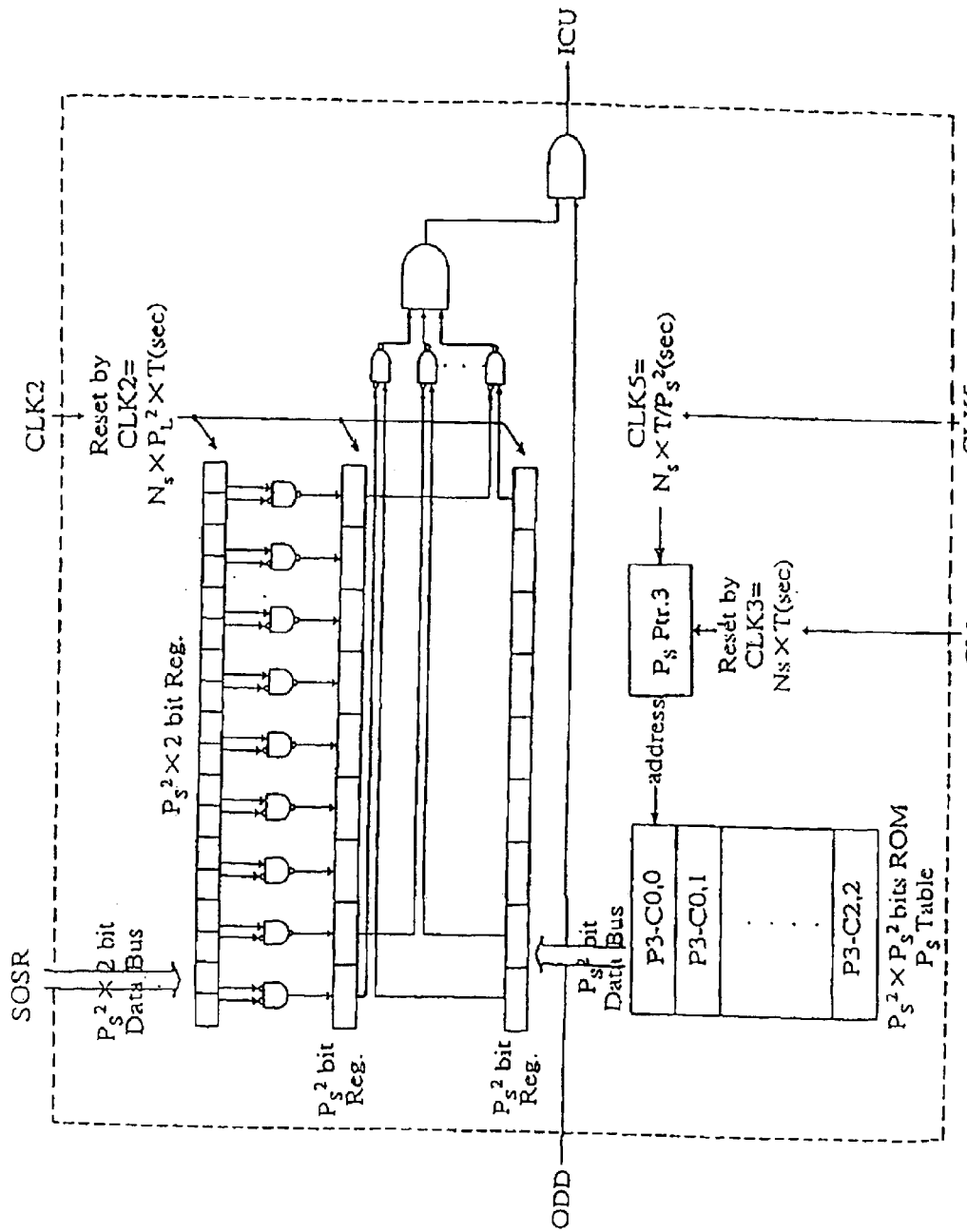
FIG. 15 illustrates the insert process unit.

IPU 390: Referring to FIG. 15, a hardware of a simple logic circuit design can achieve the aforementioned optimal design algorithm. The sum of the different prime code read from the P3 Table and the rebuilt sum are compared with each other. If the sum of the different prime code to be inserted into each chip is equivalent to the rebuilt sum, $P_S$ prime code is allowed to be inserted, and an admitted signal is output.

As shown in FIG. 15, a simple logic circuit is used. Controlled by CLK2, each data read from the $P_s^2$ bit2 is compared to the different prim code in the $P_S$ Table. The comparing method is described as the optimal algorithm. To search a possible different prime code to be inserted until each position cannot not be further inserted therewith.

Figure 16:
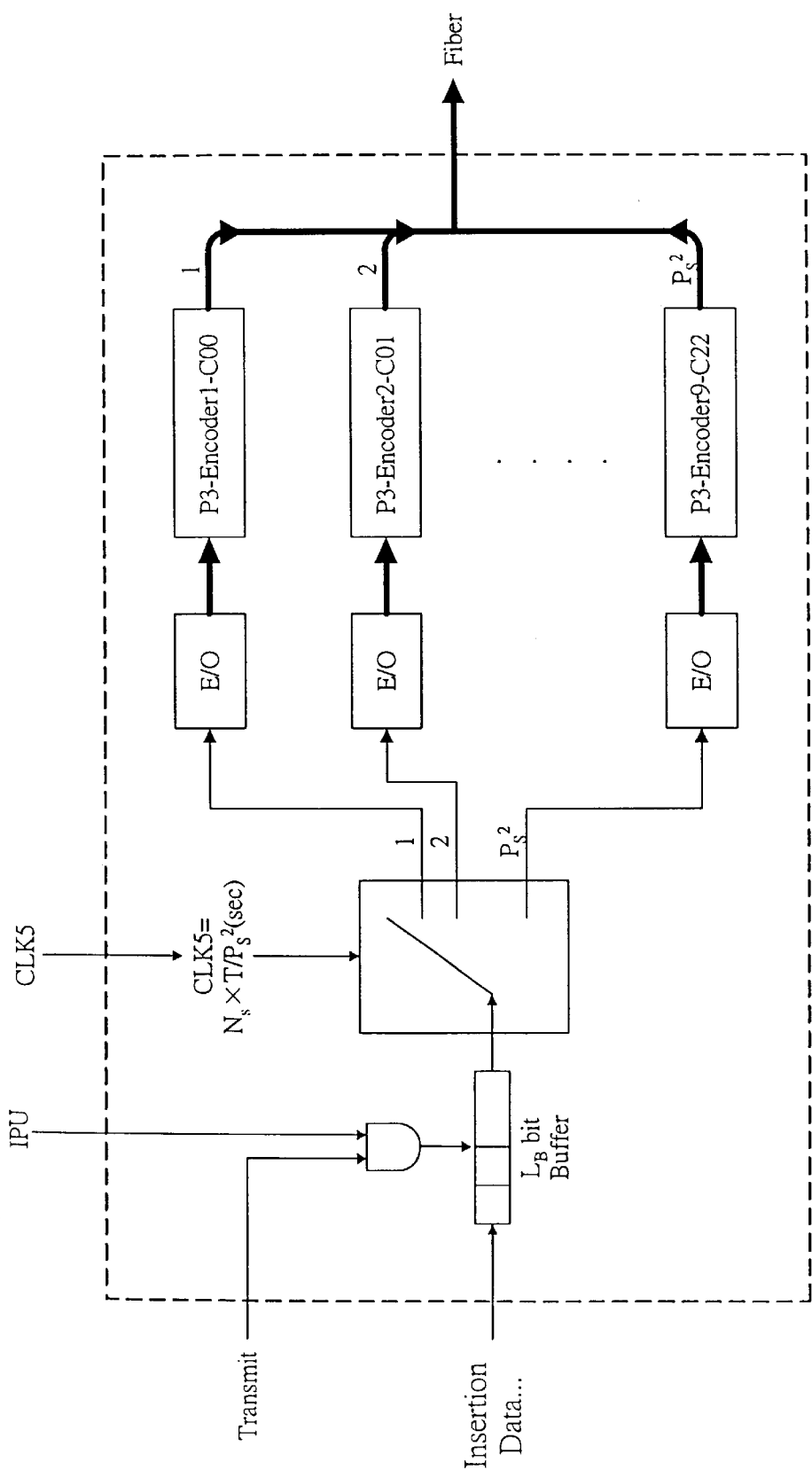
FIG. 16 illustrates the insert control unit.

ICU 400: Referring to FIG. 16, using the insert process unit 390 and the insert control unit 400 at a same clock (CLK5), the synchronization can be achieved. The different prime code can be inserted while the insert process unit 390 is processed (an admitted signal). Through the insert control unit to control, by further coupling to the optical fiber after being coded by the laser of the multi-media and delay line logic, the design of multi-media (input signal) is inserted into the original system.

The insert process unit 400 can search the $P_S$ code allowed to insert. Using a same clock CLK5=$N_S \times T/P_s^2$, after coding by a corresponding coding, the different prime code is inserted by re-coupling into the optical fiber as shown in FIG. 16.

Figure 17:
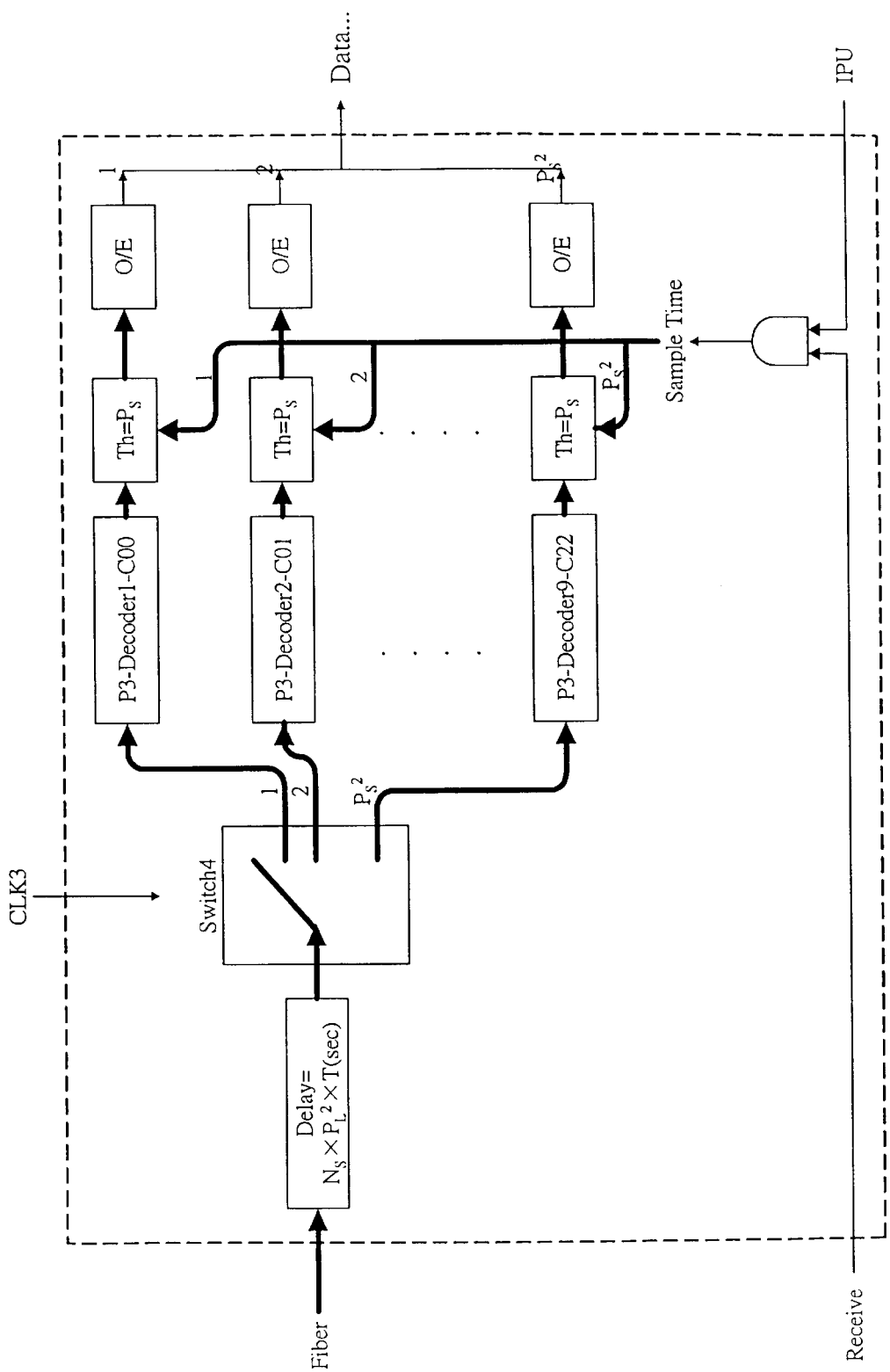
FIG. 17 illustrates the different prime code decoder.

DPCD 410: Referring to FIG. 17, the same different prime code multiplexer is required at the receiving terminal since the receiver obtains both the $P_L$ prime code and the $P_S$ code in the optical fiber simultaneously. However, being through optimal algorithm, these two prime codes are orthogonal to each other without mutually interfering. That is, the original decoder only decodes the $P_L$ prime code. For the different prime code, after coupling the signal in the optical fiber, the type and position of the inserted different prime code is detected. While the position is detected, it is input to the corresponding decoder to be decoded in a manner of synchronization. At a corresponding chip, a threshold is obtained to judge whether the decoding is successful. If the result is positive, the input multi-media data can be obtained (output signal).

Using a same method to detect the type and position of the inserted different prime code, and to decode with the corresponding $P_S$ decoder at the receiving terminal, plus determining the threshold at a proper position, the multi-media data from the transmitting terminal may be obtained after the conversion of the photodetector without affecting the transmission state of the user. Thus, the design of the smart different prime code multiplexer is complete.

A programming language is used to simulate a real communication system. A transmission system coexisting two different prime codes, P7 prime code and P3 prime code, is used as an example. Each parameter of the smart different prime code multiplexer is calculated to interpret the operation state. The parameters of the multiplexer is as follows (a detailed description is further provided later):

(b) The length of the register in the channel occupied sensor (COSR): $N_S=4$ (c) The threshold of the overload decision device (ODD): $N_o=7$.

Through a timing recover to be synchronous with the transmitting terminal, via five clocks of the control unit obtained by the frequency divider, the current parameters of the multiplexer T=2.94 nsec (T=1/$R_c$=1/2.94G) is shown as Table 2.

TABLE 2

| CLK1 | Eq1: $7^2 \times 2.94 = 144$ (nsec) |
|---|---|
| CLK2 | Eq2: $4 \times 7^2 \times 2.94 = 576$ (nsec) |
| CLK3 | Eq3: $4 \times 2.94 = 11.8$ (nsec) |
| CLK4 | Eq4: $4 \times 2.94/7^2 = 0.24$ (nsec) |
| CLK5 | Eq5: $4 \times 2.94/3^2 = 1.31$ (nsec) |

Figure 18:
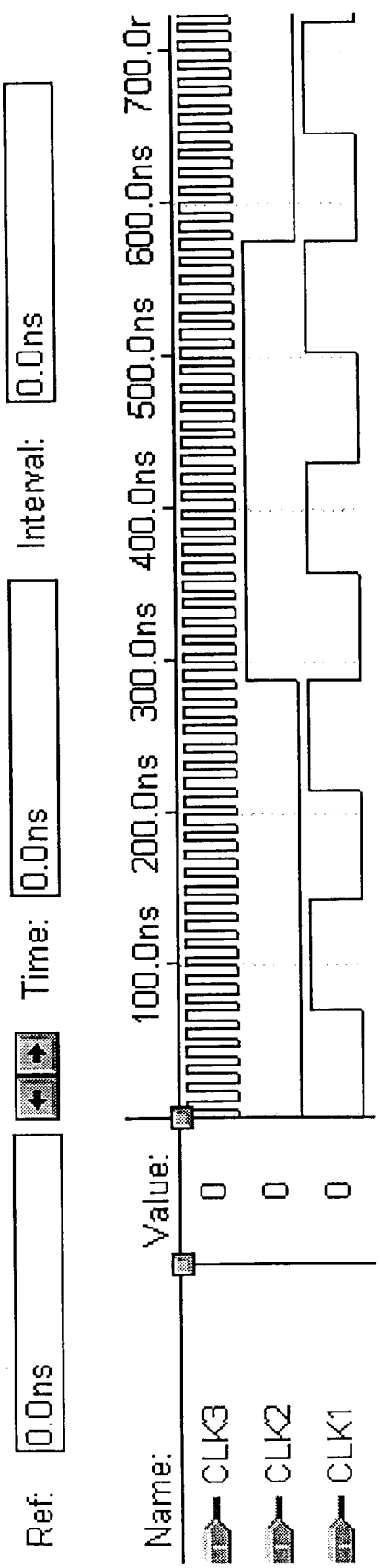
FIGS. 18–19 shows a simulating result using VHDL language.
Figure 19:
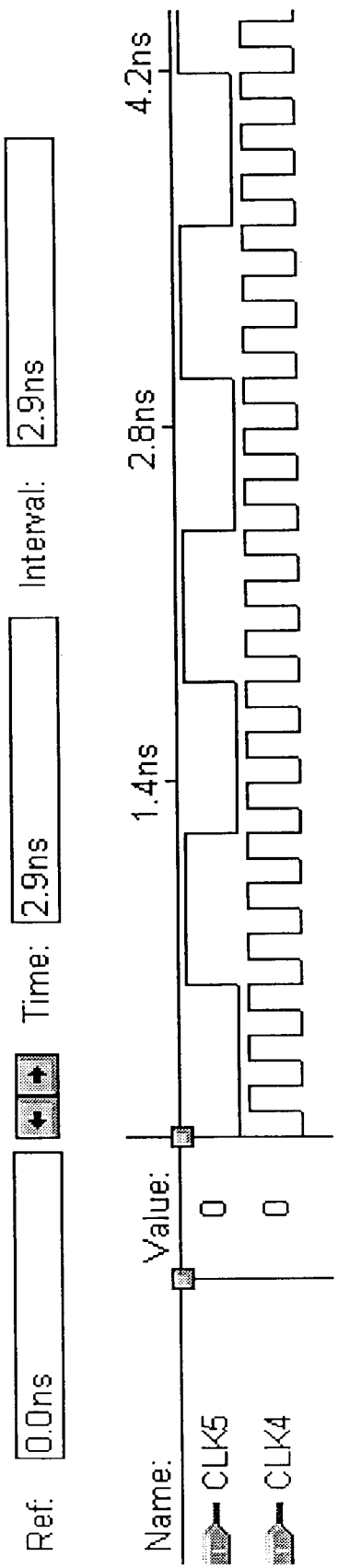

The simulation after the program CHDL is shown as FIG. 18 and FIG. 19.

Figure 20:
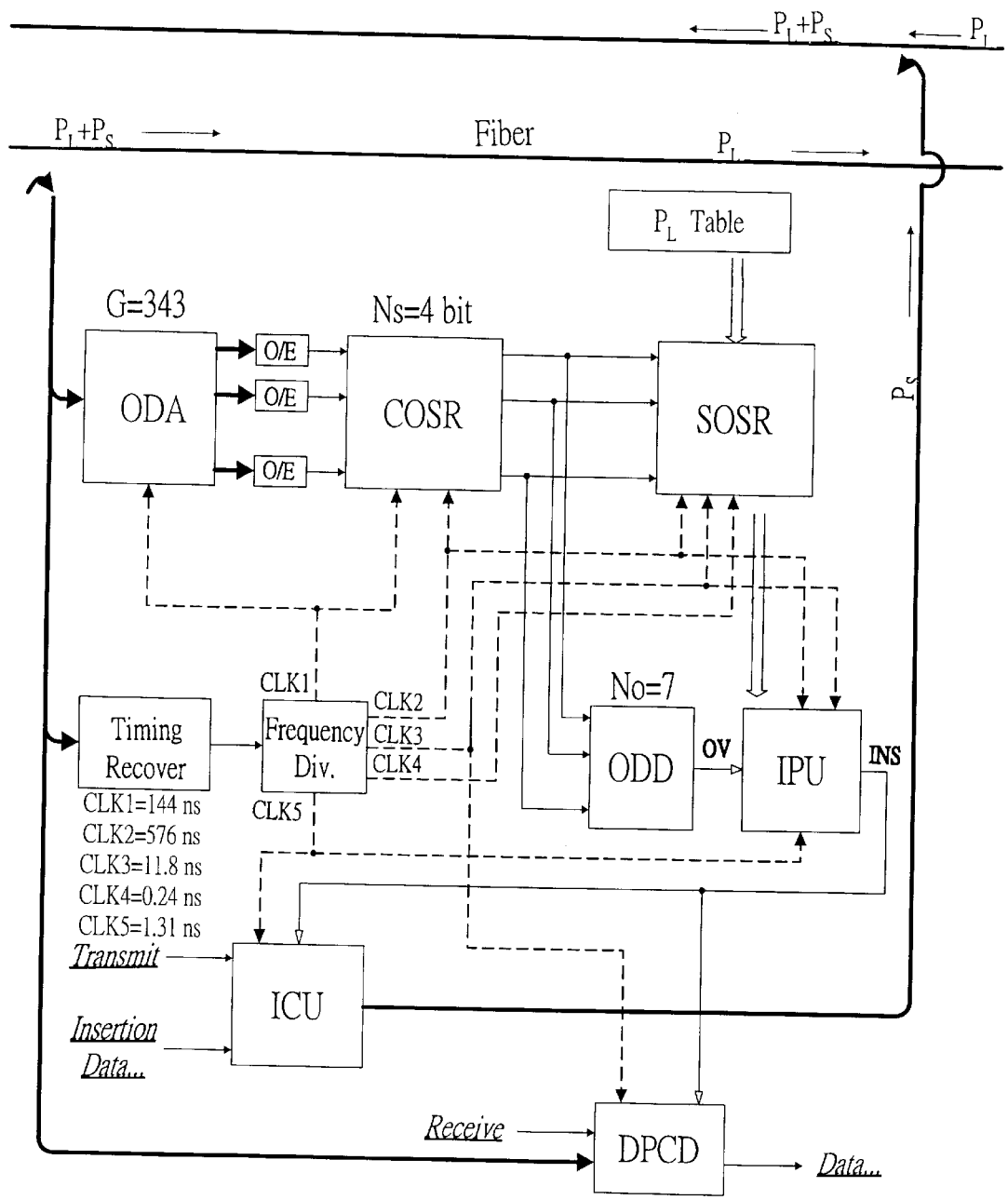
FIG. 20 shows the simulated smart multiplexer.
Figure 21:
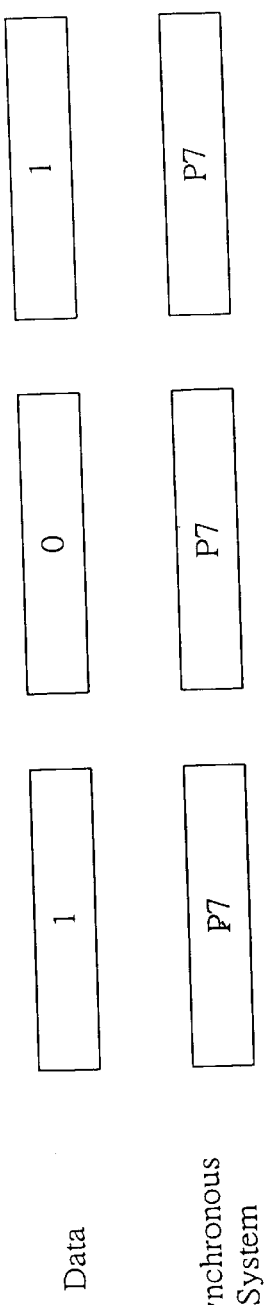
FIG. 21 shows the decision of the threshold for $P_3$ code to determine whether the decoding is successful.

A block diagram of the smart multiplexer is shown in FIG. 20. The execution results of the multiplexer are shown as Table 3.

TABLE 3

| | P7 Main User Group | P3 Secondary User Group | | | | | | | | | |
|---|---|---|---|---|---|---|---|---|---|---|---|
| a | $C_71,1, C_72,2, C_73,3,$ $C_74,4, C_75,5, C_76,6$ | Prime Code Position | $C_70,0$ 0 | $C_70,0$ 5 | $C_70,0$ 10 | $C_71,0$ 18 | $C_71,0$ 19 | $C_71,2$ 27 | $C_70,0$ 37 | $C_70,0$ 39 | — — |
| b | $C_72,2, C_73,3, C_74,4,$ $C_75,5, C_76,6$ | Prime Code Position | $C_70,0$ 0 | $C_70,0$ 5 | $C_70,0$ 16 | $C_70,0$ 23 | $C_70,0$ 25 | $C_72,1$ 32 | $C_70,0$ 33 | $C_70,0$ 35 | $G_7,$ 37 |
| c | $C_70,0, C_71,1, C_72,2,$ $C_73,3, C_74,4, C_75,5,$ $C_76,6$ | Busy | | | | | | | | | |

Users: 6.
The amplification: G=343(25.4 dB).
The length of the register in the channel occupied sensor: $N_S=4$.
The threshold of the overload decision device: $N_o=7$.
Bit Rate ($R_b$)=60M bits/sec.
Chip Rate ($R_c$)=2.94 G chips/sec.
Eq 1: CLK1=144 nsec.
Eq2: CLK2=576 nsec.
Eq3: CLK3=11.8 nsec.
Eq4: CLK4=0.24 nsec.
Eq5: CLK5=1.31 nsec.

Assuming that there are six users in the main communication system using the prime code: $C_71, 1, C_72, 2, C_73, 3, C_74, 4, C_75, 5, C_76, 6$ to be spread as shown in

TABLE 1

| User | User1 | User2 | User3 | User4 | User5 | User6 |
|---|---|---|---|---|---|---|
| Prime Code | $C_71, 1$ | $C_72, 2$ | $C_73, 3$ | $C_74, 4$ | $C_75, 5$ | $C_76, 6$ |

When each user is transmitting date with a bit rate ($R_b$)=60 Mbit/sec, each 1 bit is spread into $7^2=49$ Chip by the prime code $P_7$. Therefore, the chip rate ($R_c$)=2940M= 2.94G chips/sec in the optical fiber. The parameters of the multiplexer design are as follows:

(a) The amplification of the optical decoder array (ODA): $G=7^2 \times 7=343$ ($10 \times \log 343 = 25.4$ dB)

(a) Under normal multiplexing state:

When there are only 6 users each of which is using $C_71,1, C_72,2, C_73,3, C_74,4, C_75,5, C_76,6$ to spread, respectively, the multiplexer is to judge whether the threshold is reached ($N_o=7$). While it is under the multiplexing state, there are eight compatible P3 prime codes as detected by the multiplexer.

(b) When the user is off line:

When User1 ($C_71,1$) is off line, the main user group has only five users remain, the optical fiber transmission channel enters a free state. Under this circumstance, the number of the coexistent prime codes can be increased to 9.

(c) Busy state:

If the number of users is increased up to 7 (User7: $C_70,0$ is added), to maintain a normal operation of the main user group, the overload decision device once observe the addition of the users, the multiplexing operation state is terminated. The transmission of the multi-media data is stopped until the channel is retrieved to a normal operation state.

In the following paragraphs, the quasi synchronous prime code coder and decoder are introduced. In an optical fiber communication system, a prime code is generally used to spread. Therefore, to understand the operation theory of coding and decoding, the characteristics of the prime code signal:

While designing an asynchronous code, the data are processed by employing data line with different delay time to generate prime code. For example, Data "1" becomes CO,O=100100100 after being delayed with Delay=1, 3, 6. The prime code after the delay line of the asynchronous coder is observed whether the threshold (Th=3) of the P-3 code is exceeded, so as to determine whether the decoding is achieved.

Figure 22:
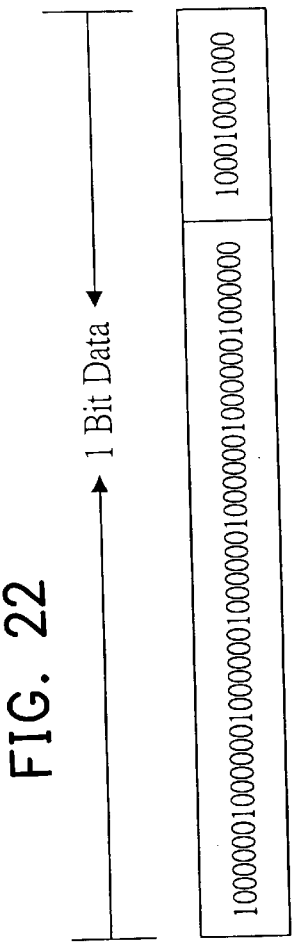
FIG. 22 shows the asynchronous code and the quasi synchronous code.

To simplify the discussion of the quasi asynchronous concept, P7-Code and P3-Code are used as the representative integral system. The design concept can be extended to other prime code system. In the asynchronous optical fiber system, only one kind of prime code (for example, P7-Code) is used to code. By assembling two different prime codes (for example, P3-Code and P7-Code) as a new spread code, called as quasi synchronous prime code to perform coding is shown as FIG. 22.

Figure 23:
FIG. 23 shows the data spreading to the quasi synchronous code.

Each bit of data uses the asynchronous code to spread into 58 Chips (P7+P3=49+9=58) as shown in FIG. 23.

Figure 24:
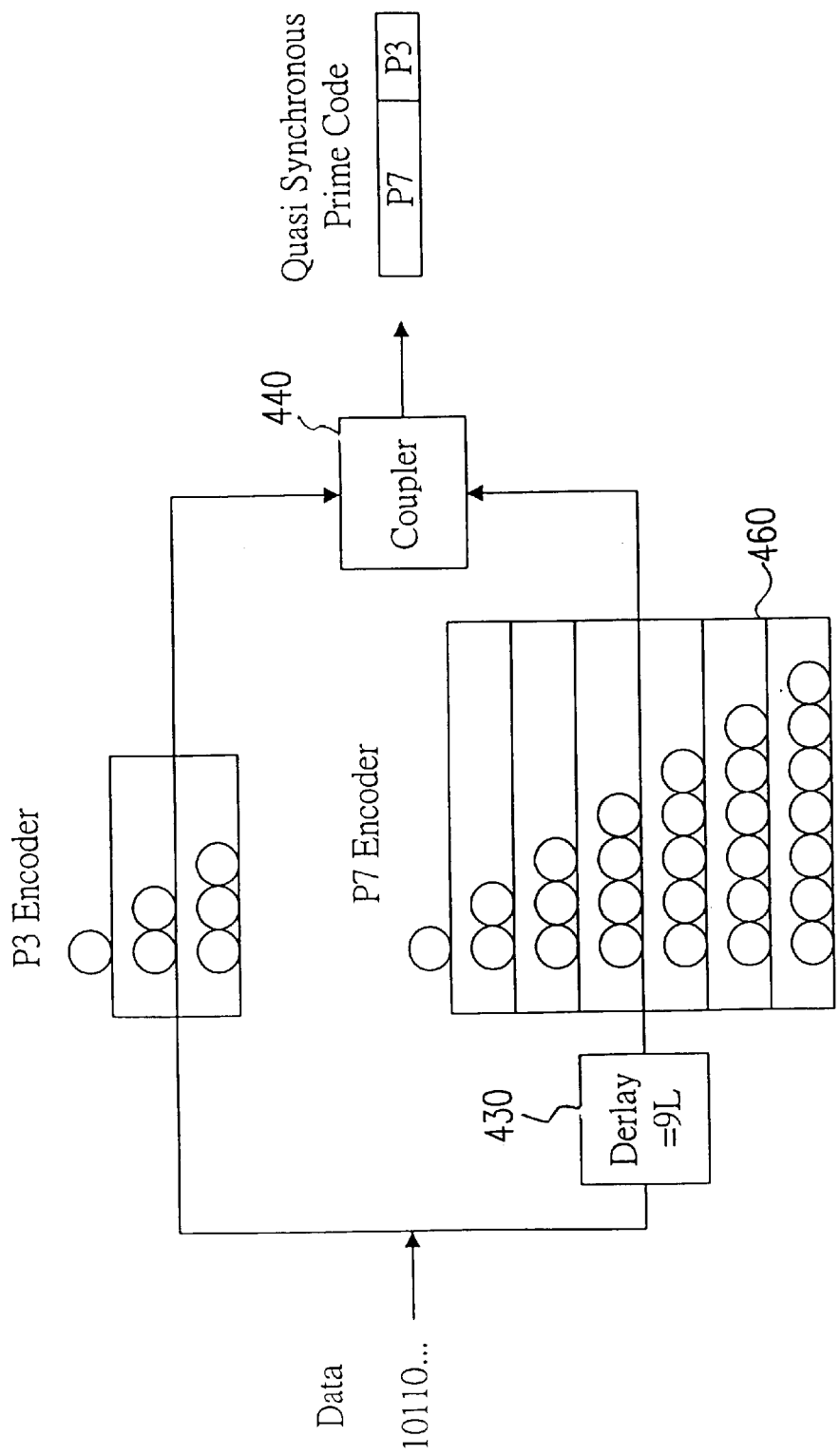
FIG. 24 shows the coding system.

The design of the coding system:

Referring to FIG. 24, two different kinds of prime code systems (P3-Code and P7-Code) are used to generate a quasi synchronous code with a design as follows:

A. The data is coded by the coder of the original asynchronous system with the delay line technique. Thus, the well-known coding technique of the asynchronous system can be utilized directly without introducing other design coder.

B. The major difference from the asynchronous system coder is that the data is processed by a delay 430, followed by being input to the P-7 Code coder. The delay time can be determined by the chip length as 9L (P3=9). While different kinds of quasi prime codes are combined, the delay length has to be varied according to specific requirement.

C. The output of the P7 and P3 coders are coupled together by a coupler 440 to form a new coding technique called quasi synchronous code.

The code is then input to the optical fiber transmission system to complete the quasi synchronous system design as shown in FIG. 24.

Figure 25:
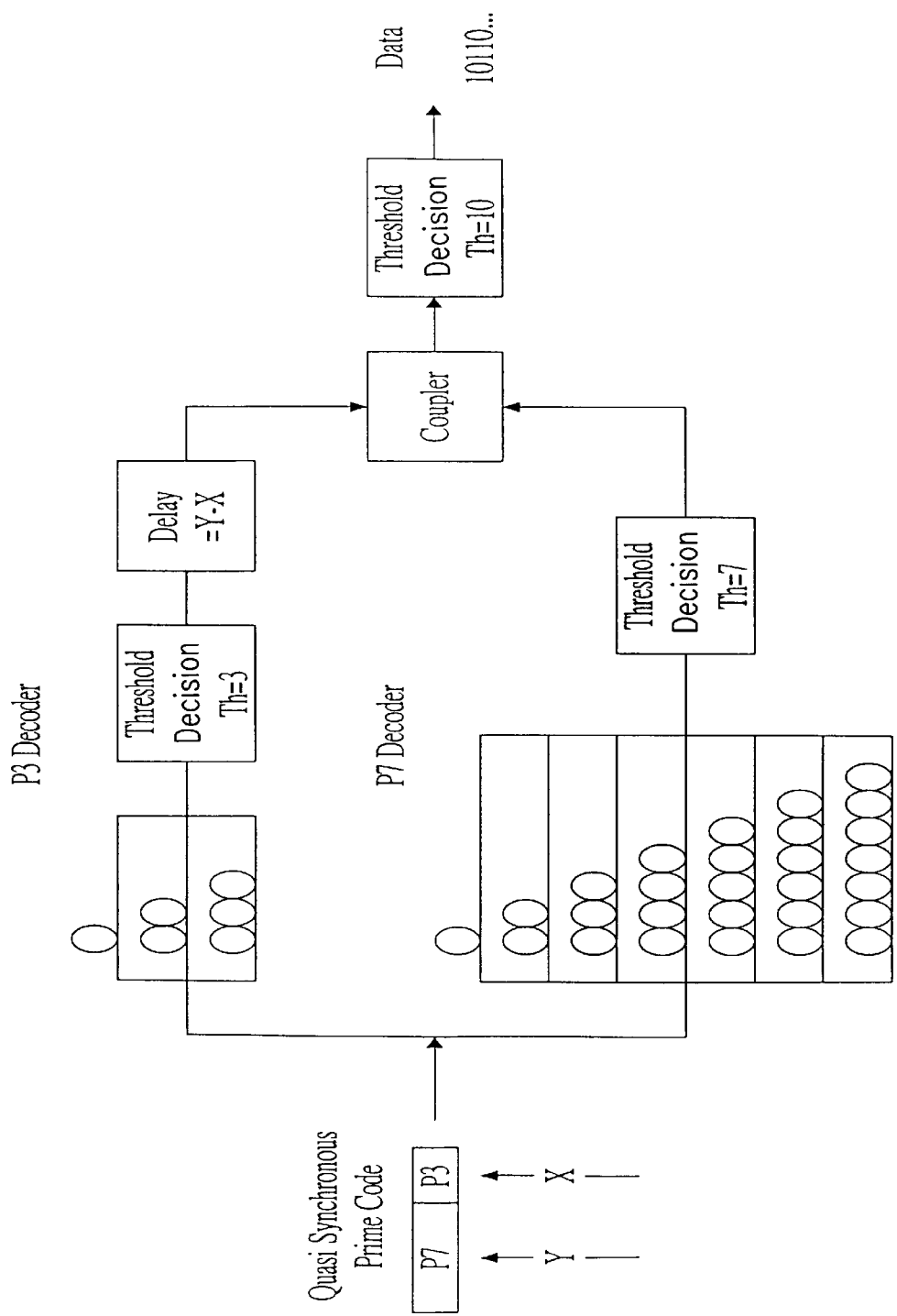
FIG. 25 shows the decoding system.

The decoding system design:

Referring to FIG. 25, after the asynchronous coding, the asynchronous decoder can be designed to precisely transmit the data with a capacity competitive with the synchronous system:

A. Assuming that the two different prime codes assembling the asynchronous code have thresholds at positions Y and X, respectively. For an synchronous code assembled by P-7 Code and P-3 Code, the thresholds are Th=7 and Th=3.

B. After receiving the asynchronous code at the receiving terminal, the data are decoded by the decoder in the original asynchronous system and the delay line technique to judge whether it has exceeded the threshold. Thus, the decoding can be performed using the conventional decoding technique used in the asynchronous system without any additional design.

C. The major difference from the asynchronous system is that after being processed by the P-3 decoder, the data is further input to a delay with a delay time (Delay= Y-X). The delay time is determined by a difference between the threshold of the P-7 Code and the threshold of the P-3 Code.

D. The output of the P-3 decoder and the delay are coupled with each other by a coupler, followed by being input to a threshold decision device. The threshold is determined by the two prime codes that assemble the asynchronous codes system (Th=P3+P7=10).

E. After delaying (Delay=Y-X) the previous P-3 decoder, the thresholds of the P-7 Code and the P-3 Code are shifted to a same position. Therefore, the designed asynchronous code reach a maximum, while the remaining P-7 Code and the P-3 Code fails to decode since the thresholds cannot be shifted to a same position.

F. The received asynchronous code is converted into the data output originally to complete the design as shown in FIG. 25.

Taking the prime code 3 and the prime code 7 as examples, using a programming language, for example, Turbo C, it can be proved that there is no mutual interference between the prime code 3 and the prime code 7.

Thus, the smart different code multiplexing transmission system uses two different prime codes with the characteristic that there is no mutual interference to replace the conventional synchronous division code multiplexing system. In the original optical fiber transmission system, the users or other type of data can be inserted to improve the problems of insufficient capacity. The decoding capacity is also enhanced to achieve the objective of multiplexing.

On the other hand, a quasi synchronous parallel prime code is provided by assembling different prime codes to enhance the capacity of an asynchronous. The decoding process can be performed in the original asynchronous system, however, with a capacity competitive to that of the synchronous system. The characteristics of ultra-high capacity and ultra-high operation speed are obtained.

Other embodiments of the invention will appear to those skilled in the art from consideration of the specification and practice of the invention disclosed herein. It is intended that the specification and examples to be considered as exemplary only, with a true scope and spirit of the invention being indicated by the following claims.

What is claimed is:

1. A system of a smart prime code multiplexing transmission, comprising:

a different prime code multiplexing system, using a first prime coding system to operate in transmitting signal;

a monitor system to selectively insert with a second prime coding system into the first coding system, according to an assemble of the first prime coding system;

while the monitor system is not inserted with the second prime coding system, the first prime code system is used in operation; and while the second prime coding system is inserted into the monitor system, the different prime code multiplexing system operates using the first prime coding system and the second prime coding system.

2. A quasi synchronous decoding method, comprising:

determining a first threshold value and a second threshold value;

receiving a quasi synchronous code which is further decoded using a delay line technique for judging whether or not a decoded code is greater than the first and the second threshold values;

compensating a phase difference between the first and the second threshold values with respect to a situation that the first and the second threshold values are respectively exceeded by the decoded code, wherein the first and the second thresholds values are coupled together by a coupler and are sent to a threshold decision device; and when the threshold decision device judges that the received quasi synchronous code is a signal, the received quasi synchronous code being converted into data to be output.

\* \* \* \* \*